(12) United States Patent
Homma et al.

(10) Patent No.: US 9,819,772 B2
(45) Date of Patent: Nov. 14, 2017

(54) INFORMATION PROCESSING APPARATUS AND RECORDING MEDIUM

(71) Applicants: Takeshi Homma, Kanagawa (JP); Hideki Shiro, Kanagawa (JP); Takashi Hasegawa, Kanagawa (JP)

(72) Inventors: Takeshi Homma, Kanagawa (JP); Hideki Shiro, Kanagawa (JP); Takashi Hasegawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/187,240

(22) Filed: Jun. 20, 2016

(65) Prior Publication Data

US 2017/0006146 A1 Jan. 5, 2017

(30) Foreign Application Priority Data

Jun. 30, 2015 (JP) .................. 2015-131462

(51) Int. Cl.
*H04M 1/2755* (2006.01)
*H04L 29/08* (2006.01)
(Continued)

(52) U.S. Cl.
CPC ........ *H04M 1/2755* (2013.01); *G06K 7/1095* (2013.01); *G06K 19/06037* (2013.01);
(Continued)

(58) Field of Classification Search
None
See application file for complete search history.

(56) References Cited

U.S. PATENT DOCUMENTS 8,532,299 B2  9/2013  Hara
9,038,887 B1 * 5/2015  O'Hanlon .............. G06Q 20/02
                                              235/375
(Continued)

FOREIGN PATENT DOCUMENTS

JP     2011-186925     9/2011
JP        4924206      4/2012
(Continued)

OTHER PUBLICATIONS

Extended European Search Report dated Nov. 28, 2016 in Patent Application No. 16175708.3.

*Primary Examiner* — Kristy A Haupt
(74) *Attorney, Agent, or Firm* — Oblon, McClelland, Maier & Neustadt, L.L.P.

(57) ABSTRACT

A disclosed information processing apparatus is provided with a camera function and has installed a general-purpose application and a special-purpose application. The information processing apparatus includes a reader configured to read a code structure imaged by the camera function to convert the code structure into a string having a first part and a second part, and a translator configured to translate the string. When the code structure is read by the general-purpose application, the first part of the string is translated as a URI via the general-purpose application to activate basic software function, and when the code structure is read by the special-purpose application, the second part of the string is translated via the special-purpose application to activate a function of the special-purpose application.

7 Claims, 30 Drawing Sheets

(51) Int. Cl.
  *G06K 7/10* (2006.01)
  *G06K 19/06* (2006.01)
  *H04M 3/56* (2006.01)
  *H04W 4/06* (2009.01)
  *H04M 1/725* (2006.01)

(52) U.S. Cl.
  CPC ............ H04L 67/04 (2013.01); H04L 67/141 (2013.01); H04M 3/563 (2013.01); H04W 4/06 (2013.01); H04M 1/72561 (2013.01); H04M 2250/52 (2013.01)

(56) References Cited

U.S. PATENT DOCUMENTS

| | | | |
|---|---|---|---|
| 2009/0108057 A1* | 4/2009 | Mu ................... | H04M 1/72561 235/375 |
| 2011/0101086 A1 | 5/2011 | Yach | |
| 2012/0023167 A1 | 1/2012 | Hovdal et al. | |
| 2012/0295591 A1 | 11/2012 | Boudville | |
| 2012/0305643 A1* | 12/2012 | Daniels, Jr. ............ | G06Q 50/22 235/380 |
| 2013/0157760 A1* | 6/2013 | Boudville ................ | G06K 7/12 463/31 |
| 2014/0110468 A1* | 4/2014 | Kandregula ....... | G06Q 30/0241 235/375 |
| 2014/0203085 A1* | 7/2014 | Park ..................... | G06K 7/1417 235/462.1 |
| 2016/0314329 A1* | 10/2016 | Papazian ............... | G06K 7/1417 |

FOREIGN PATENT DOCUMENTS

| | | |
|---|---|---|
| JP | 4924468 | 4/2012 |
| JP | 5299322 | 9/2013 |
| WO | WO 2012/097398 A1 | 7/2012 |

* cited by examiner

FIG.11

| TERMINAL ID | PASSWORD |
|---|---|
| 10aa | aaaa |
| 10ab | abab |
| 10ba | baba |
| 10db | xxxyyy |
| ... | ... |
| 10cd | aaaa |
| 10cf | abab |
| 10cg | baba |
| ... | ... |

FIG.12

| TERMINAL ID | TERMINAL NAME | OPERATING STATUS | RECEIVED TIME AND DATE | TERMINAL IP ADDRESS |
|---|---|---|---|---|
| 10aa | AA TERMINAL, TOKYO OFFICE, JAPAN | ONLINE (COMMUNICATION AVAILABLE) | NOV 10, 2009 13:40 | 1.2.1.3 |
| 10ab | AB TERMINAL, TOKYO OFFICE, JAPAN | OFFLINE | NOV 9, 2009 12:00 | 1.2.1.4 |
| ... | ... | ... | ... | ... |
| 10ba | BA TERMINAL, OSAKA OFFICE, JAPAN | ONLINE (COMMUNICATION AVAILABLE) | NOV 10, 2009 13:45 | 1.2.2.3 |
| 10bb | BB TERMINAL, OSAKA OFFICE, JAPAN | ONLINE (TEMPORARILY UNAVAILABLE) | NOV 10, 2009 13:50 | 1.2.2.4 |
| ... | ... | ... | ... | ... |
| 10ca | CA TERMINAL, NY OFFICE, USA | OFFLINE | NOV 10, 2009 12:45 | 1.3.1.3 |
| 10cb | CB TERMINAL, NY OFFICE, USA | ONLINE (COMMUNICATION ENGAGED) | NOV 10, 2009 13:55 | 1.3.1.4 |
| ... | ... | ... | ... | ... |
| 10da | DA TERMINAL, WASHINGTON OFFICE, USA | ONLINE (COMMUNICATION ENGAGED) | NOV 8, 2009 12:45 | 1.3.2.3 |
| 10db | DB TERMINAL, WASHINGTON OFFICE, USA | ONLINE (COMMUNICATION AVAILABLE) | NOV 10, 2009 12:45 | 1.3.2.4 |
| ... | ... | ... | ... | ... |

FIG.13

| TERMINAL ID | DESTINATION TERMINAL ID |
|---|---|
| 10aa | 10ab,10ac,10ad,10ae |
| 10ab | 10aa,10ca,10cb |
| 10ba | 10aa,10ab,10ca,10cb,10da,10db |
| ... | ... |
| 10cd | 10gj,10kb,10tk |
| 10cf | 10dd,10cg |
| 10cg | 10af,10cd,10cc |
| 10db | 10aa,10cb,10ad |
| ... | ... |

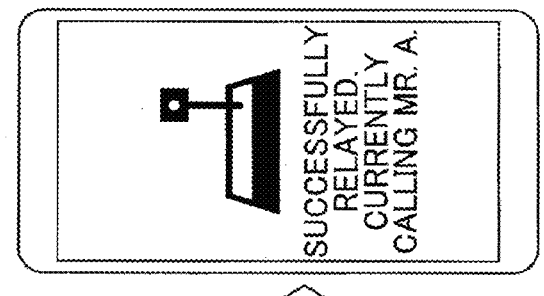
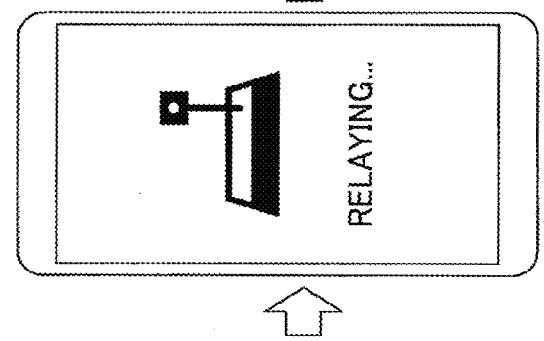
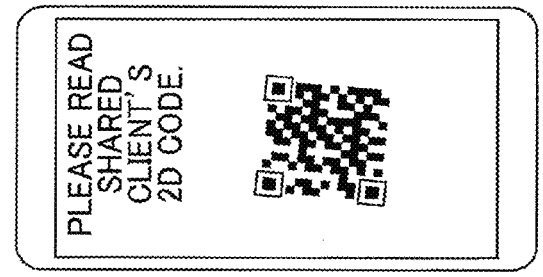
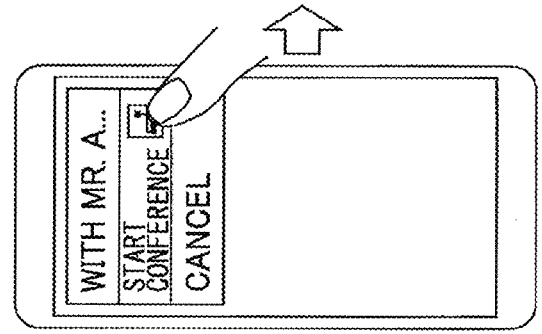
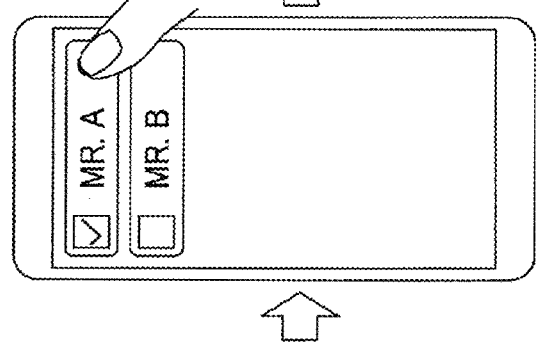

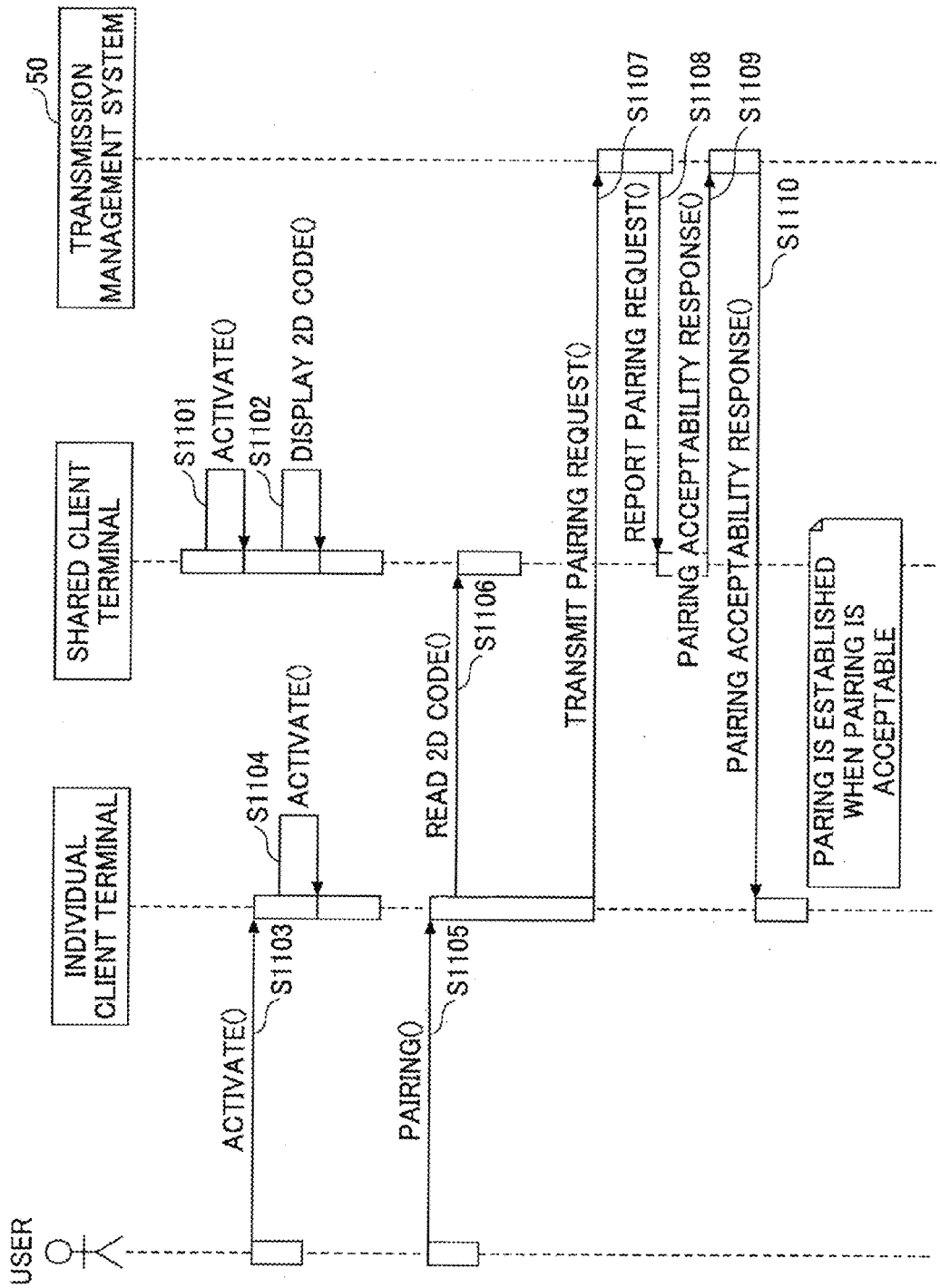

{"type":"PairingResponse", "result":"accept"}

{"type":"StartConf", "ConfId":"361", "ConfToken":"kgueq_iq91a"}

{type: conf_join_request, conf_id:abcde}

{type: conf_join_response, status:completed}

INFORMATION PROCESSING APPARATUS AND RECORDING MEDIUM

BACKGROUND OF THE INVENTION

1. Field of the Invention

The disclosures discussed herein relate to an information processing apparatus and a recording medium.

2. Description of the Related Art

Recent widespread use of mobile terminals such as smartphones or tablet terminals has resulted in growing demand for easy access to information from other neighboring terminals. To satisfy such demand, there is proposed a specific technology to read information from an image of a code (e.g. a two-dimensional (2D) code) taken by a camera function of a mobile terminal. This technology has been widely used in various aspects of everyday life; for example, users may use this technology to avoid manual input of information or users, or may use the technology as tokens of boarding rights of railway tickets.

The code of this type is used in a way in which a user receives an instruction of an intended use or purpose of the code and uses the code by following the received instruction. For example, the code is used such that the user voluntarily images the presented code when the user is already informed of the intention or purpose such as to acquire a URL for shifting to the Web page or to set Wi-Fi without an input operation. Or such an instruction to cause the user to image the presented code may be formed with characters or pictograms. When the code is used as a railway ticket or the like, the user is informed of an instruction to present the code to the reader or the like so as to allow the reader to image the code. Thus, the code of this type is designed to perform appropriate operations only when the user uses the code appropriately.

On the other hand, Japanese Unexamined Patent Application Publication No. 2011-186925 (Patent Document 1) discloses a two-dimensional code including a public area and a non-public area. However, not all the information included in this two-dimensional code is read by a general-purpose reader of the terminal, and hence, the usage of this type of the code may differ from the above-described usage of the code.

RELATED ART DOCUMENT

Patent Document

Patent Document 1: Japanese Unexamined Patent Application Publication No. 2011-186925

The above-described widespread usage of reading the code may result in a growing recognition that imaging the code may provide some kind of information or may operate some kind of systems. The users who do not know or understand a specific purpose or specific usage of the code may attempt to image the code to acquire information using their general-purpose readers of the terminals when the code is displayed on terminals familiar to the users with an expectation of receiving some kind of information.

However, this kind of usage is unexpected and hence no effective operations may be performed, failing to meet the users' expectation as a result. Further, such an attempt will not provide any information about the usage of the code, resulting in useless, ineffective operations. Note that the information embedded in the code may be encrypted or obfuscated to complicate acquiring information. However, this merely prevents generating a secondary problem from the acquired information but does not resolve a primary problem.

SUMMARY OF THE INVENTION

Accordingly, it is a general object in one embodiment of the present invention to provide a technology capable of reading a code structure having information convertible into two or more translations according to applications that have read the code structure so as to serve two or more roles adapted to various types of usage that substantially obviate one or more problems caused by the limitations and disadvantages of the related art.

According to an aspect of embodiments, there is provided an information processing apparatus provided with a camera function and having a general-purpose application and a special-purpose application installed therein. The information processing apparatus includes a reader configured to read a code structure imaged by the camera function to convert the code structure into a string having a first part and a second part; and a translator configured to translate the string. When the code structure is read by the general-purpose application, the first part of the string is translated as a URI via the general-purpose application to activate basic software function, and when the code structure is read by the special-purpose application, the second part of the string is translated via the special-purpose application to activate a function of the special-purpose application.

Other objects, features and advantages of the present invention will become more apparent from the following detailed description when read in conjunction with the accompanying drawings.

BRIEF DESCRIPTION OF THE DRAWINGS

FIG. 11 is a diagram illustrating an example of an authentication management table;

FIG. 12 is a diagram illustrating an example of a terminal management table;

FIG. 13 is a diagram illustrating an example of a destination list management table;

FIGS. 19A to 19E are diagrams illustrating an example of an operation to select a destination and start calling the destination;

FIG. 20 is a sequence diagram illustrating a process example of pairing;

DETAILED DESCRIPTION OF THE PREFERRED EMBODIMENTS

The following illustrates preferred embodiments.

Figure 1:
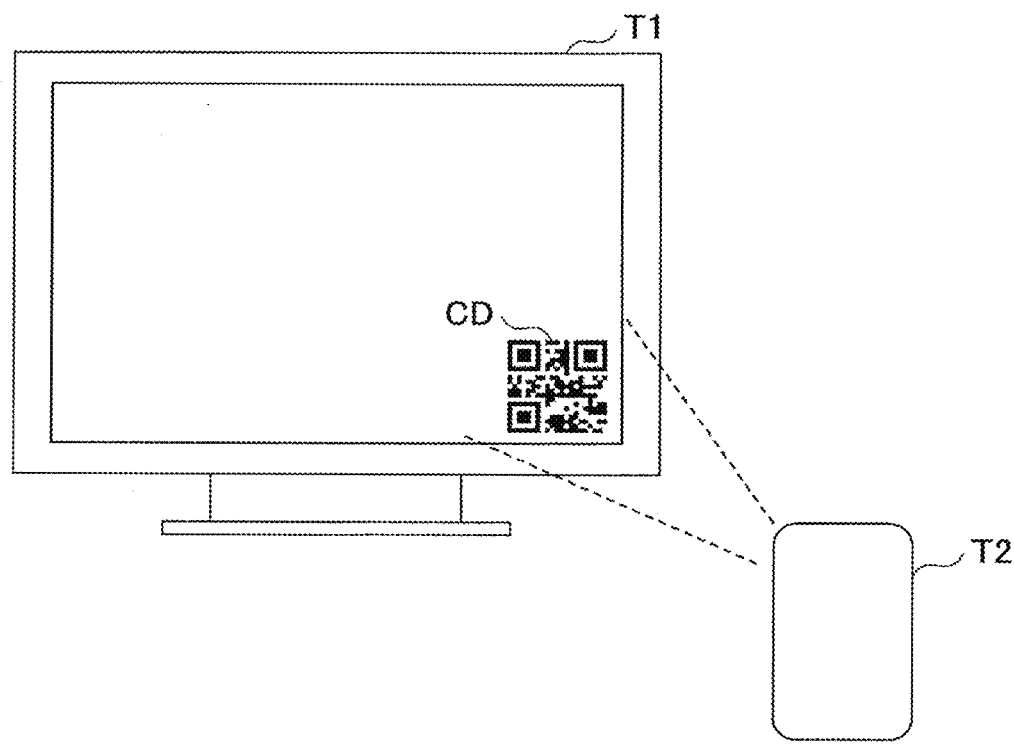
FIG. 1 is a diagram illustrating a configuration example of a system according to an embodiment.

FIG. 1 is a diagram illustrating a configuration example of a system according to an embodiment. In FIG. 1, an information processing apparatus T1 may serve as a shared client terminal (a special-purpose apparatus), an individual client terminal (a general-purpose apparatus) of a conference system (a transmission system), or a terminal applied to other uses. The information processing apparatus T1 in this example is configured to display a code (e.g., 2D code) on a screen as part of primary processes. An information processing apparatus T2 includes a camera function and a code analysis function, and is configured to scan the code CD displayed on the information processing apparatus T1. A user may read the code CD, intending to follow originally intended use, or may read the code CD without such intention.

Figure 2:
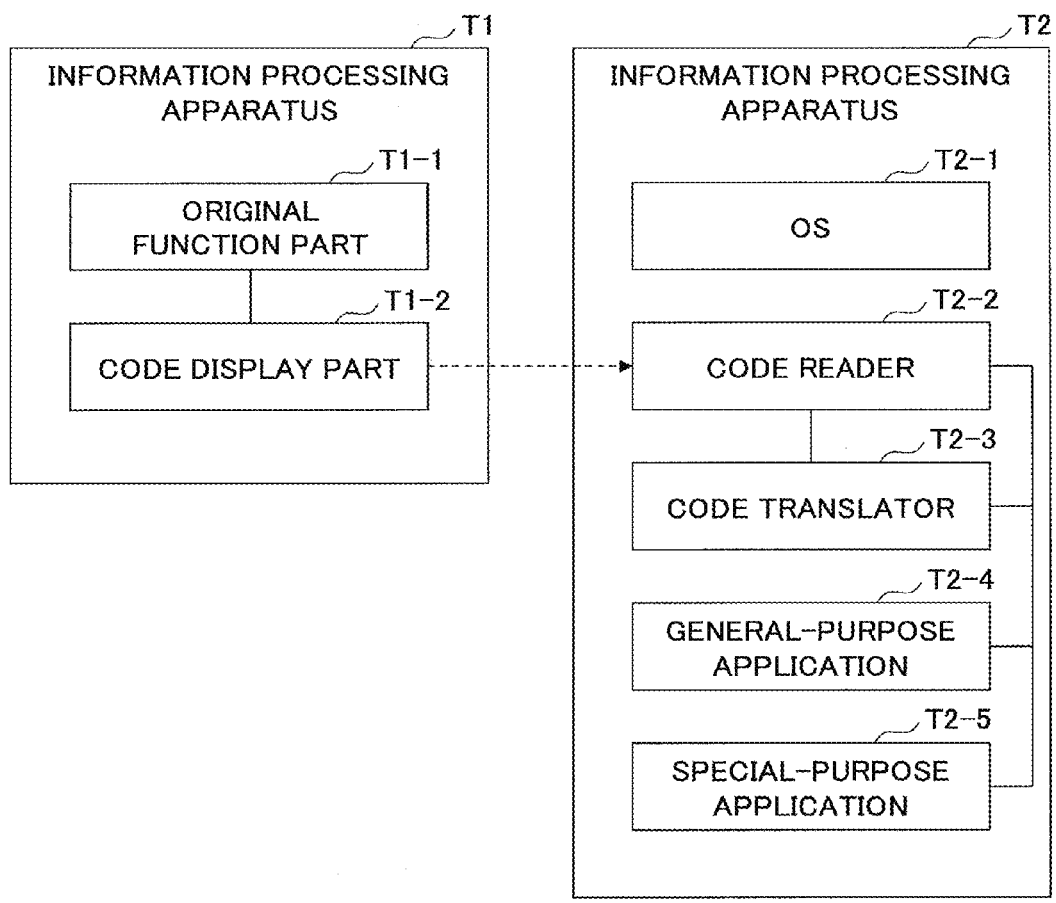
FIG. 2 is a diagram illustrating a software configuration example of an information processing apparatus.

FIG. 2 is a diagram illustrating software configuration examples of the information processing apparatus T1 and the information processing apparatus T2. In FIG. 2, the information processing apparatus T1 includes an original function part T1-1 configured to perform an original process in the information processing apparatus T1, and a code display part T1-2 configured to display a code as part of the original process.

The information processing apparatus T2 includes an operating system OS T2-1, a code reader T2-2, a code translator T2-3, a general-purpose application T2-4, and a special-purpose application T2-5. The OS T2-1 is basic software of the information processing apparatus T2, and includes functions such as a Web access function, and an application activation function with a URL scheme. The code reader T2-2 is configured to image a code via a camera function of the information processing apparatus T2, and convert the captured image (imaged code) into a string via the code analysis function. The code translator T2-3 is configured to translate the read code into a uniform resource identifier (URI) in a case where the code is read via the general-purpose application T2-4 whereas the code translator T2-3 is configured to uniquely translate the read code in a case where the code is read via the special-purpose application T2-5.

The general-purpose application (or a general-purpose reader application) T2-4 reads a two-dimensional code and the like, displays an embedded string, and activates, when the read code is a URI, the Web access function or applications. Note that the general-purpose application T2-4 may include all or part of functions of the code reader T2-2 and the code translator T2-3. The special-purpose application T2-5 may be an individual client application or the like of the conference system. Note that details of the software configurations or hardware configurations of the information processing apparatuses T1 and T2 will be described later with reference to the specific examples.

Figure 3A:
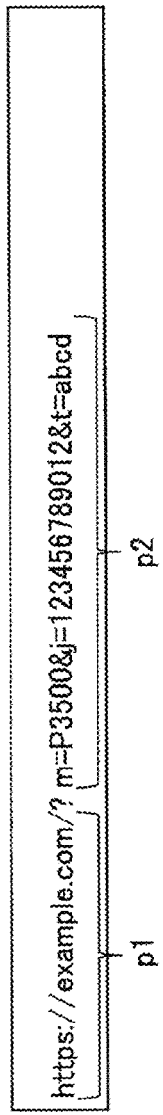
FIGS. 3A to 3C are diagrams illustrating examples of strings embedded in a code.
Figure 3B:
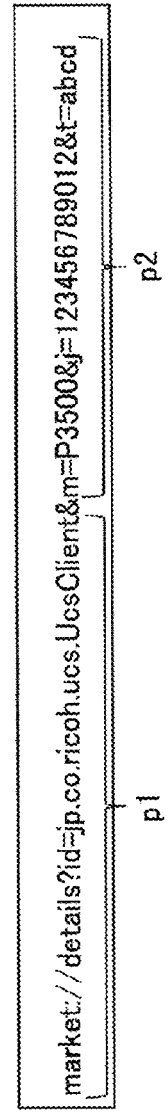
Figure 3C:
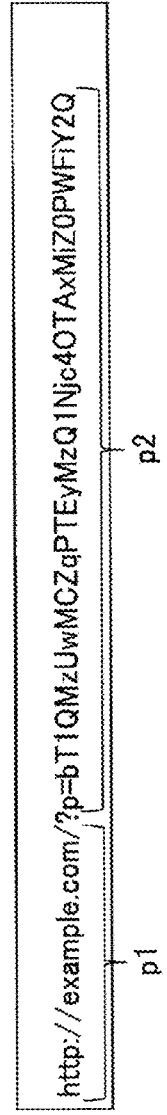

FIGS. 3A to 3C are diagrams illustrating examples of strings embedded in the code CD. FIG. 3A illustrates a string including a URI part p1 (also called a "part p1") defined by RFC3986 followed by a parameter part p2 (also called a "part p2"). The part p2 includes respective values of parameters m, j, and t. The general-purpose application T2-4 mainly uses the part p1, (and does not use the part patient 2 in principle) whereas the special-purpose application T2-5 uses the part p2. Note that the general-purpose application T2-4 may use part of the part p2 as a parameter for the Web access. Further, the special-purpose application T2-5 may use part of the part p1 as a parameter for the unique process.

FIG. 3B illustrates a string including a parameter part p2 subsequent to a URI part p1 for activating an application via a URL scheme. The general-purpose application T2-4 mainly uses the part p1, (and does not use the part p2 in principle) whereas the special-purpose application T2-5 uses the part p2. Note that the general-purpose application T2-4 may use the part p2 as a parameter for activating the applications via a URL scheme. Further, the special-purpose application T2-5 may use part of the part p1 as a parameter for the unique process.

FIG. 3C illustrates a string including a obfuscated or encoded parameter part obtained as a result of encoding the parameter part of FIG. 3A with the base 64.

Figure 4A:
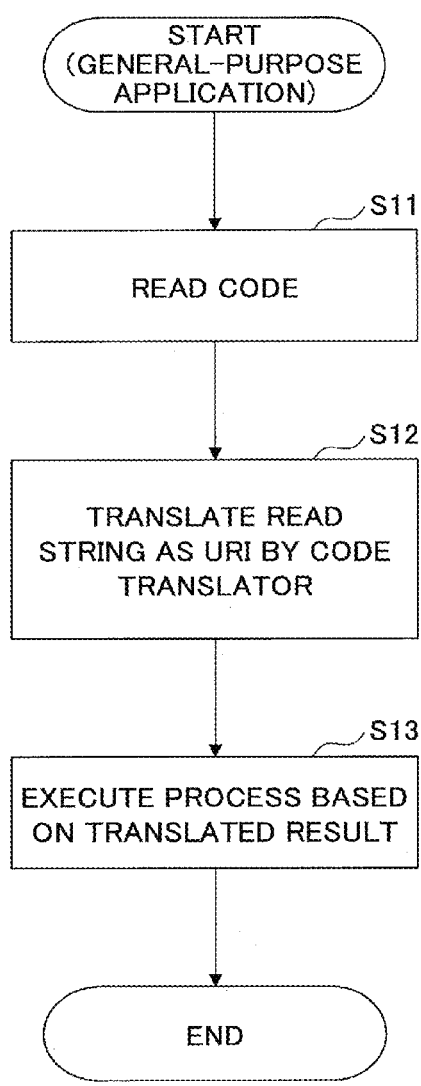
FIGS. 4A and 4B are flowcharts illustrating process examples of the embodiment.
Figure 4B:
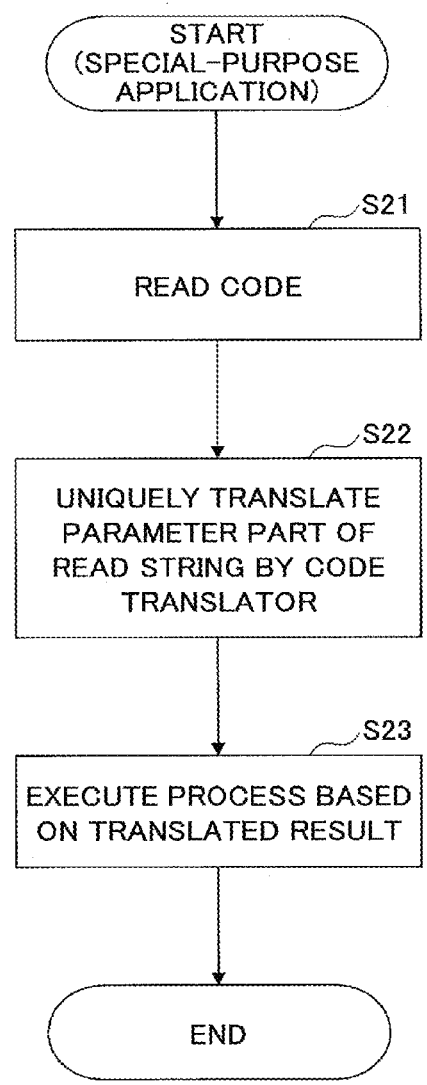

FIGS. 4A and 4B are flowcharts illustrating examples of processes in accordance with the embodiment. FIG. 4A illustrates a case where the code CD is read by the general-purpose application T2-4. When the general-purpose application T2-4 reads the code CD by the code reader T2-2 (step S11), the general-purpose application T2-4 translates a string of the read code as a URI by the code translator T2-3 (step S12). The general-purpose application T2-4 subsequently executes a process based on a translated result (step S13).

Figure 5A:
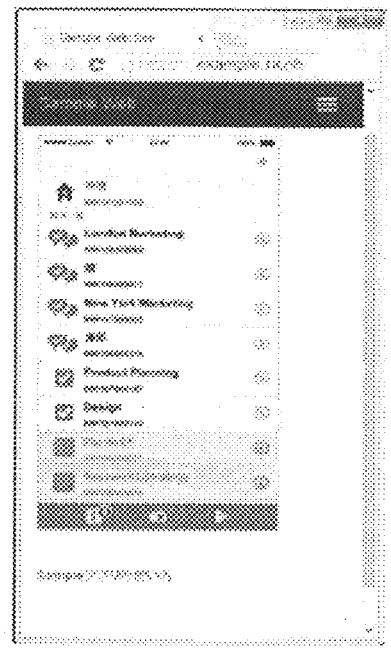
FIGS. 5A and 5B are diagrams illustrating examples of screens displayed by processes based on analysis results.

When the translated code is a string illustrated in FIG. 3A, a Web access is executed using the part p1 as a URL. When the translated code is a string illustrated in FIG. 3B, the special-purpose application T2-5 is activated by the part p1. FIG. 5A indicates an example of a screen of the information processing apparatus T2 in a case where the Web access is executed corresponding to the string illustrated in FIG. 3A, and the screen displays a page illustrating an operational method or the like of the special-purpose application T2-5. In this case, the user who performed reading of the code CD without knowing the method of the code CD is given an opportunity to read the displayed page in order to understand the method of the code CD.

Figure 5B:

FIG. 5B illustrates an example of a screen of the information processing apparatus T2 in a case where the special-purpose application T2-5 is activated corresponding to the string illustrated in FIG. 3B. In this case, the special-purpose application T2-5 is actually activated so that the user is given an opportunity to understand the read code CD being used in the special-purpose application T2-5.

Next, FIG. 4B illustrates a case where the code CD is read by the special-purpose application T2-5. When the special-purpose application T2-5 reads the code CD by the code reader T2-2 (step S21), the special-purpose application T2-5 uniquely translates a string of the read code by the code translator T2-3 (step S22). The special-purpose application T2-5 subsequently executes a process based on a translated result (step S23). The process based on the translated result may vary with different special-purpose applications T2-5. The following illustrates an example of the process based the translated result when the special-purpose application T2-5 is an individual client application of the conference system.

Role of Code in Conference System

In addition to the shared client terminal (special-purpose apparatus), the individual client terminals (general-purpose apparatuses) may be allowed to participate in a conference. In this case, the conference is performed without exposure of address lists (address books) on the shared client terminal by making phone calls from the individual client terminals. However, the use of the shared client terminal may be advantageous in terms of performance of a camera, a display, a speaker and the like. Hence, a large number of users frequently desire to use the shared client terminal to hold a TV conference or the like using their individual accounts when the shared client terminal exists nearby. Thus, the conference may be initiated by causing the shared client terminal to display a code representing the information indicating each user himself/herself on the shared client terminal, allowing the individual client terminals to read the displayed code, and then transmitting a calling request to allow the shared client terminal to start the conference.

Further, even when the user does not call the shared client terminal, and waits to receive an incoming call from a communication counterpart, the incoming call to the individual client terminal is automatically transferred to the shared client terminal, which allows the shared client terminal to be paired in advance with the individual client terminal. In such a case, the shared client terminal is also caused to display a code representing the information indicating the user himself/herself, and the individual client terminal is allowed to read the code displayed on the shared client terminal.

Further, when the conference that has already started in the individual client terminal is moved to the shared client terminal, the shared client terminal is also caused to display a code representing the information indicating the user himself/herself, and the individual client terminal is caused to read the displayed code.

Overall System Configuration

Figure 6:
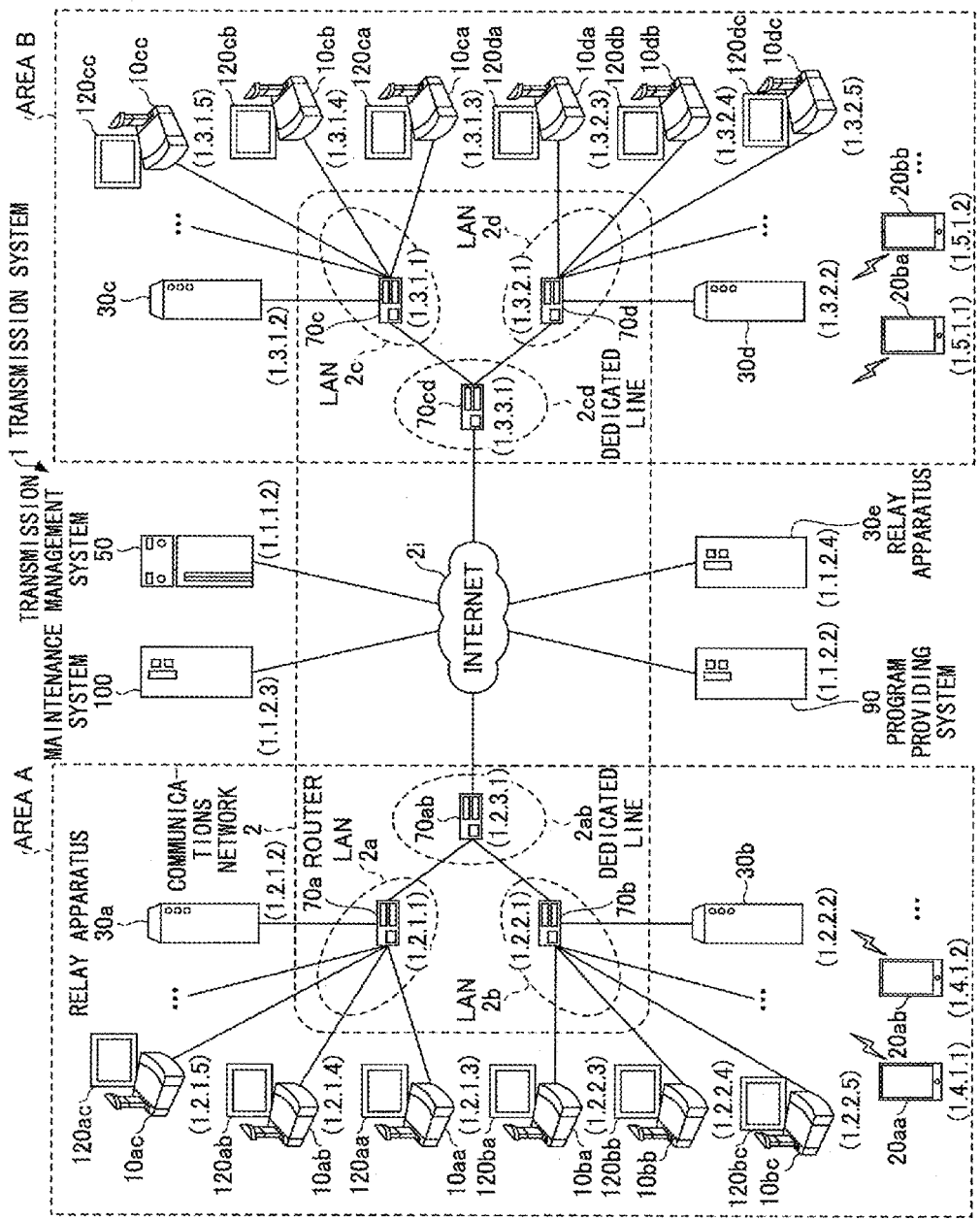
FIG. 6 is a schematic diagram illustrating a transmission system.

FIG. 6 is a schematic diagram illustrating a transmission system 1, and an outline of the system is illustrated first with reference to FIG. 6.

Note that examples of the transmission system 1 include a data providing system configured to transmit content data in one direction from one transmission terminal to another transmission terminal via a transmission management system, and a communications system configured to communicate information, emotions, and the like between two or more transmission terminals via a transmission management system. The communications system is configured to mutually communicate information, emotions, and the like between two or more communication terminals (corresponding to the "transmission terminals") via the communication management system (corresponding to the "transmission management system"). Examples of such a communications system include a TV conference system, a video telephony system, an audio teleconference system, a voice telephony system, a personal computer (PC) screen sharing system, and the like.

In the following embodiments, the transmission system 1, the transmission management system 50, and the transmission terminal 10 are illustrated based on the assumption of a TV conference system as an example of a communications system, a TV conference management system as an example of a communications management system, and a TV conference terminal as an example of a communications terminal. The transmission system according to the embodiments may be applied to the TV conference system as well as being applied to the communications system and the like.

The transmission system 1 illustrated in FIG. 6 is configured to include two or more first transmission terminals (10*aa*, 10*ab*, ... ) serving as TV conference-specific terminals or special-purpose apparatuses, respective displays (120*aa*, 120*ab*, ... ) of the transmission terminals (10*aa*, 10*ab*, ... ), two or more second transmission terminals (20*aa*, 20*ab*, ... ) serving as mobile terminals or general-purpose apparatuses, two or more relay apparatuses (30*a*, 30*b*, 30*c*, 30*d*, and 30*e*), a transmission management system 50, a program providing system 90, and a maintenance system 100. In the following embodiments, the "transmission terminals" may also be referred simply to as "terminals", and the "transmission management system" may be referred simply to as the "management system".

In the transmission system 1 according to the embodiments, a "transmission terminal 10" may represent any one of the transmission terminals (10*aa*, 10*ab*, ... ), a "transmission terminal 20" may represent any one of the transmission terminals (20*aa*, 20*ab*, ... ), a "display 120" may represent any one of the displays (120*aa*, 120*ab*, ... ), and a "relay apparatus 30" may represent any one of the relay apparatuses (30*a*, 30*b*, 30*c*, 30*d*, and 30*e*).

The transmission terminals 10 and 20 are configured to transmit to and receive from other apparatuses various types of information. For example, the transmission terminals 10 and 20 establish a session with other terminals 10 and 20, and communicate content data such as voice data and image data with other terminals 10 and 20 via the established session. The TV conference is thus implemented between two or more terminals 10 and 20 in the transmission system 1.

Note that the "content data" hereinafter represent "image data and voice data". Note that the data transmitted between the terminals 10 and 20 are not limited to those illustrated in the embodiments. For example, the content data may be text data alone, or the content data may include voice data and image data in addition to the text data. Further, the image data may be dynamic (moving) image data or static image data. The image data may include both the dynamic image data and the static image data.

Further, to start a TV conference in the transmission system 1 of the embodiment, a user who desires to start the TV conference operates a predetermined terminal 10 or 20, and the operated terminal 10 or 20 transmits start request information to the management system 50.

Note that the start request information indicates information that requests starting a session in the TV conference. The start request information includes information to specify a terminal 10 or 20 serving as a session counterpart. The terminal 10 or 20 that transmits the start request information is hereinafter referred to as a "start request terminal 10 or 20". The counterpart terminal 10 or 20 specified as a session counterpart is hereinafter referred to as a "destination terminal 10 or 20".

Note that the destination terminal (the session counterpart) 10 or 20 may be one terminal 10 or 20, or two or more terminals 10 or 20. Specifically, the transmission system 1 may implement a TV conference utilizing a session established not only between the two terminals 10 or 20 but also utilizing sessions between the three or more terminals 10 or 20.

The management system 50 is configured to manage the terminals 10 and 20, and the relay apparatuses 30 in a unitary manner. The management system 50 establishes sessions between the terminals 10 and 20 to implement a TV conference by calls (voice communications) between the terminals 10 and 20.

When the management system 50 receives session start request information from the predetermined terminal 10 or 20, the management system 50 establishes a session between the terminal 10 or 20 (start request terminal) that transmits the start request information and the destination terminal 10 or 20 so as to start the TV conference.

Further, routers (70a, 70b, 70c, 70d, 70ab, and 70cd) illustrated in FIG. 6 are configured to select the optimal routes for content data. In this embodiment, a "router 70" represents any one of the routers (70a, 70b, 70c, 70d, 70ab, and 70cd). The relay apparatus 30 is configured to relay the content data between the terminals 10 and 20.

The program providing system 90 includes a not-illustrated hard disk (HD) storing terminal-specific programs for causing the terminal 10 or 20 to implement various types of functions, and may be able to transmit the terminal-specific programs to the terminal 10 or 20. The HD of the program providing system 90 further stores relay apparatus-specific programs for causing the relay apparatus 30 to implement various types of functions, and the program providing system 90 may be able to transmit the relay apparatus-specific programs to the relay apparatus 30. The HD of the program providing system 90 further stores transmission management-specific programs for causing the management system 50 to implement various types of functions, and the program providing system 90 may be able to transmit the transmission management-specific programs to the management system 50.

The maintenance system 100 is a computer configured to maintain, manage, or support at least one of the terminals 10 and 20, the relay apparatus 30, the management system 50, and the program providing system 90. For example, when the maintenance system 100 is located domestically, and the terminals 10 and 20, the relay apparatus 30, the management system 50, and the program providing system 90 are located abroad, the maintenance system 100 remotely performs maintenance, management, support, and the like on at least one of the terminals 10 and 20, the relay apparatus 30, the management system 50, and the program providing system 90 via the communications network 2. Further, the maintenance system 100 may perform maintenance such as the management of the model number, the manufacturer's serial number, the customer, the maintenance and inspection, the management of the failure history, and the like on at least one of the terminals 10 and 20, the relay apparatus 30, the management system 50, and the program providing system 90 without intervention by the communication network 2.

Moreover, the terminals (10aa, 10ab, 10ac, 10a . . . ), the relay apparatus 30a, and the router 70a are connected to one another via a LAN 2a such that the terminals (10aa, 10ab, 10ac, 10a . . . ), the relay apparatus 30a, and the router 70a may be communicating with one another. The terminals (10ba, 10bb, 10bc, 10b . . . ), the terminals (20aa, 20ab, . . . ), the relay apparatus 30b, and the router 70b are connected to one another via a LAN 2b such that the terminals (10ba, 10bb, 10bc, 10b . . . ), the terminals (20aa, 20ab, . . . ), the relay apparatus 30b, and the router 70b may be communicating with one another. Moreover, the LAN 2a and the LAN 2b are connected via a dedicated line tab including a router 70ab such that the LAN 2a and the LAN 2b may be communicating with each other. The LAN 2a and the LAN 2b are constructed within a predetermined area A. For example, the predetermined area A may be Japan, the LAN 2a may be constructed within a Tokyo Office, and the LAN 2b may be constructed within an Osaka Office.

The terminals (10ca, 10cb, 10cc, 10c . . . ), the relay apparatus 30c, and the router 70c are connected to one another via a LAN 2c such that the terminals (10ca, 10cb, 10cc, 10c . . . ), the relay apparatus 30c, and the router 70c may be communicating with one another. The terminals (10da, 10dd, 10dc, 10d . . . ), the relay apparatus 30d, and the router 70d are connected to one another via a LAN 2d such that the terminals (10da, 10dd, 10dc, 10d . . . ), the relay apparatus 30d, and the router 70d may be communicating with one another. The LAN 2c and the LAN 2d are connected via a dedicated line 2cd including a router 70cd such that the LAN 2c and the LAN 2d may be communicating with each other. The LAN 2c and the LAN 2d are constructed within a predetermined area B. For example, the predetermined area B may be the United States, the LAN 2c may be constructed within a NY Office, and the LAN 2d may be constructed within a Washington, D.C. Office. The area A and the area B are connected via the Internet 2i from the routers 70ab and 70cd such that the area A and the area B may be communicating with each other.

In addition, the management system 50 and the program providing system 90 are connected to the terminals 10 and 20 and the relay apparatus 30 via the Internet 2 such that the management system 50 and the program providing system 90 may be communicating with the terminals 10 and 20 and the relay apparatus 30. The management system 50 and the program providing system 90 may be installed within the area A or the area B, or may be installed within an area other than these areas.

The relay apparatus 30e is connected to the terminals 10 and 20 via the Internet 2i such that the relay apparatus 30e and the terminals 10 and 20 may be communicating with each other. The relay apparatus 30e is in constant operation. Hence, in order for the relay apparatus 30e to minimally receive adverse traffic effect of the local area A or B, the relay apparatus 30e is installed within the area other than the areas A and B. Thus, the relay apparatus 30e is used for relaying content data when the terminals 10 and 20 are communicating with a terminal installed in another local area. Further, the relay apparatus 30e may also be used as an emergency relay apparatus when communications are performed between the terminals within the same local area and the relay apparatus installed within this area is failing or inactive.

Note that in this embodiment, LAN 2a, LAN 2b, the dedicated line tab, the Internet 2i, the dedicated line 2cd, the LAN 2c, and the LAN 2d form the communications network 2 of the embodiment. The communications network 2 may include parts that perform wired and wireless communications.

In FIG. 6, a combination of four numbers provided beneath each of the terminals 10 and 20, the relay apparatus 30, the management system 50, the router 70, the program providing system 90, and the maintenance system 100 simply represents an IP address of IPv4. For example, the IP address of the terminal 10aa is "1.2.1.3". The IP address may be IPv6 instead of IPv4; however, the IPv4 is employed in this specification for simplifying the illustration.

Hardware Configuration

The following describes hardware configurations of the embodiment.

TV Conference-Specific Terminal

Figure 7:
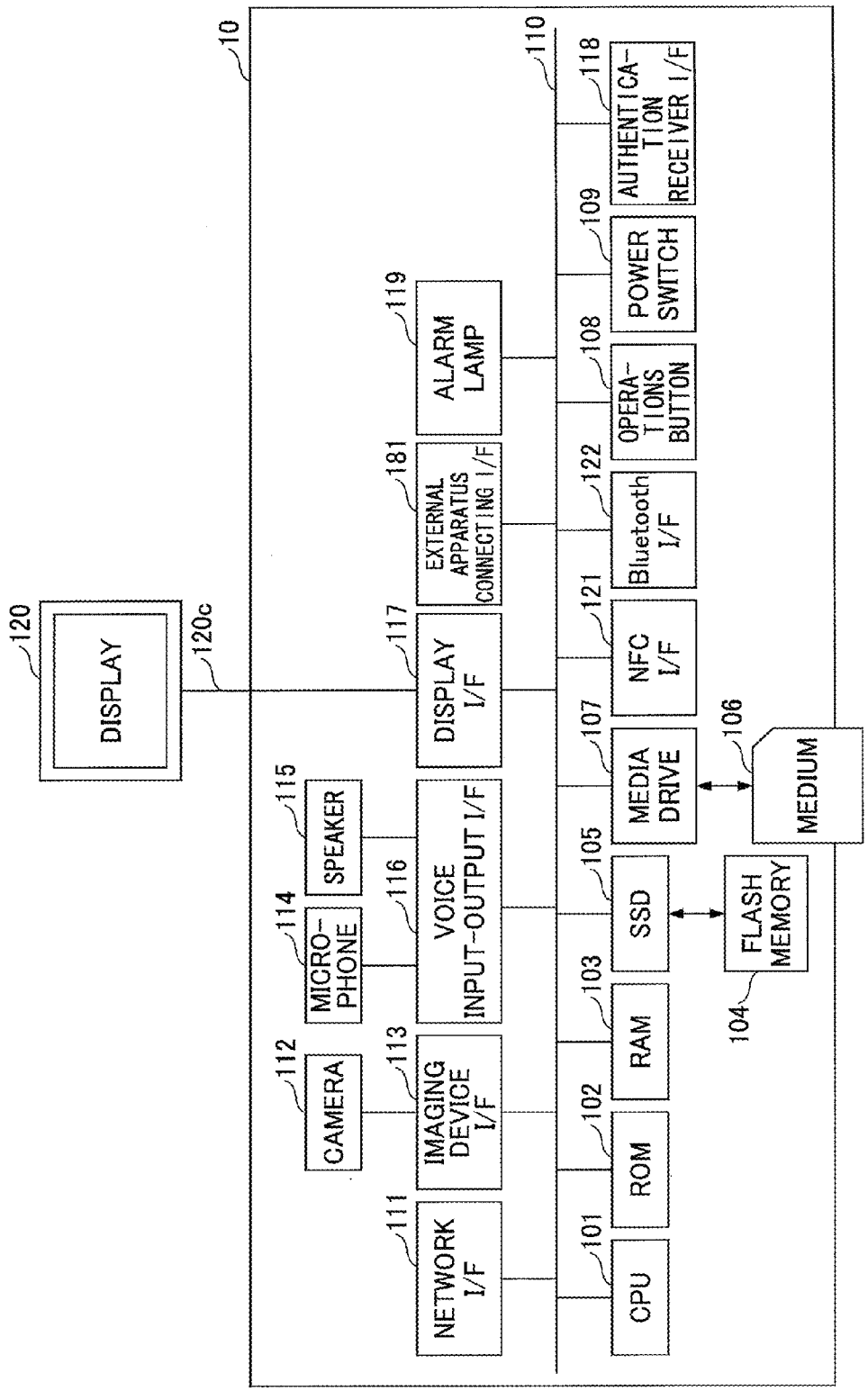
FIG. 7 is a hardware configuration diagram illustrating an example of a TV conference-specific terminal.

FIG. 7 is a hardware configuration diagram illustrating a TV conference-specific terminal 10. As illustrated in FIG. 7, the terminal 10 according to the embodiment includes a central processing unit (CPU) 101 configured to control overall operations of the terminal 10, a read only memory (ROM) 102 configured to store terminal-specific programs, a random access memory (RAM) 103 configured to serve as a work area of the CPU 101, a flash memory 104 configured to store various types of data such as image data or voice data, a solid-state drive (SSD) 105 configured to control reading or writing of various types of data with respect to the flash memory 104 in accordance with the control of the CPU 101, a medium drive 107 configured to control reading or writing of various types of data with respect to a medium 106 such as flash memory or the like, an operations button 108 configured to be operated (by a user) for electing a destination of the terminal 10 or the like, a power supply switch 109 configured to switch ON or OFF the power of the terminal 10, a network interface (I/F) 111, and an authentication receiving I/F 118 for performing data transmission using the later-described communications network 2.

The terminal 10 further includes a built-in camera 112 configured to image a subject to acquire image data in accordance with the control of the CPU 101, an imaging device I/F 113 configured to control the drive of the camera 112, a built-in microphone 114 configured to input voice, a built-in speaker 115 configured to output voice, a voice input-output I/F 116 configured to process input and output of voice signals between the microphone 114 and the speaker 115 in accordance with the control of the CPU 101, a display I/F 117 configured to transmit image data to an externally attached display 120 in accordance with the control of the CPU 101, an external apparatus connecting I/F 181 for connecting various types of external apparatuses, an alarm lamp 119 configured to report abnormality of various functions of the terminal 10, and a bus line 110 such as an address bus or a data bus for electrically connecting the above-described components.

The terminal 10 may further include an NFC I/F 121 or a Bluetooth (registered trademark) I/F 122. The NFC I/F 121 is a communications interface compatible with one of the international standards called near field communications (NFC) standards such as ISO/IEC 180928 etc., for performing data communications by bringing two or more devices within a short distance of each other. The Bluetooth I/F 122 is a communications interface compatible with Bluetooth (IEEE 802.15.1, etc.) that is standardized as one of near field wireless communications technologies.

The display 120 is a display part formed of liquid crystal or organic EL (OLED), and is configured to display an image of the subject or operational icons. The display 120 is connected to the display I/F 117 via a cable 120c. The cable 120c may be an analog RGB (VGA) signal-specific cable, a component video-specific cable, an high-definition multimedia interface (HDMI) (registered trademark) or a DVI (digital video interactive) signal-specific cable.

The camera 112 includes lenses and a solid-state image sensor configured to convert an image (video) of a subject into electronic data by converting light waves into electric charges. Examples of the solid-state image sensor include a CMOS (complementary metal oxide semiconductor) and a CCD (charge coupled device).

The external apparatus connecting I/F 181 is configured to be connected via a universal serial bus (USB) to external apparatuses such as an external camera, an external microphone, and an external speaker. When the external camera is connected to the external apparatus connecting I/F 181, the external camera is driven in preference to the built-in camera 112 in accordance with the control of the CPU 101. Similarly, when the external microphone or the external speaker is connected to the external apparatus connecting I/F 181, the external microphone or the external speaker connected to the external apparatus connecting I/F 181 is driven in preference to a corresponding one of the built-in microphone 114 and the built-in speaker 115 in accordance with the control of the CPU 101.

Note that the recording medium 106 is configured to be removable from the terminal 10. When the recording medium 106 is formed of a nonvolatile memory configured to read or write data in accordance with the control of the CPU 101, the nonvolatile memory is not limited to the flash memory 104. The nonvolatile memory serving as the recording medium 106 may be an EEPROM (Electrically Erasable and Programmable ROM), or the like.

The above-described terminal-specific programs may be distributed in a form of a computer-readable recording medium (i.e., the recording medium 106, etc.) storing the programs in files of an installable format or executable format. Alternatively, the above-described terminal-specific programs may be stored in the ROM 102 instead of the flash memory 104.

General-Purpose Terminal

Figure 8:
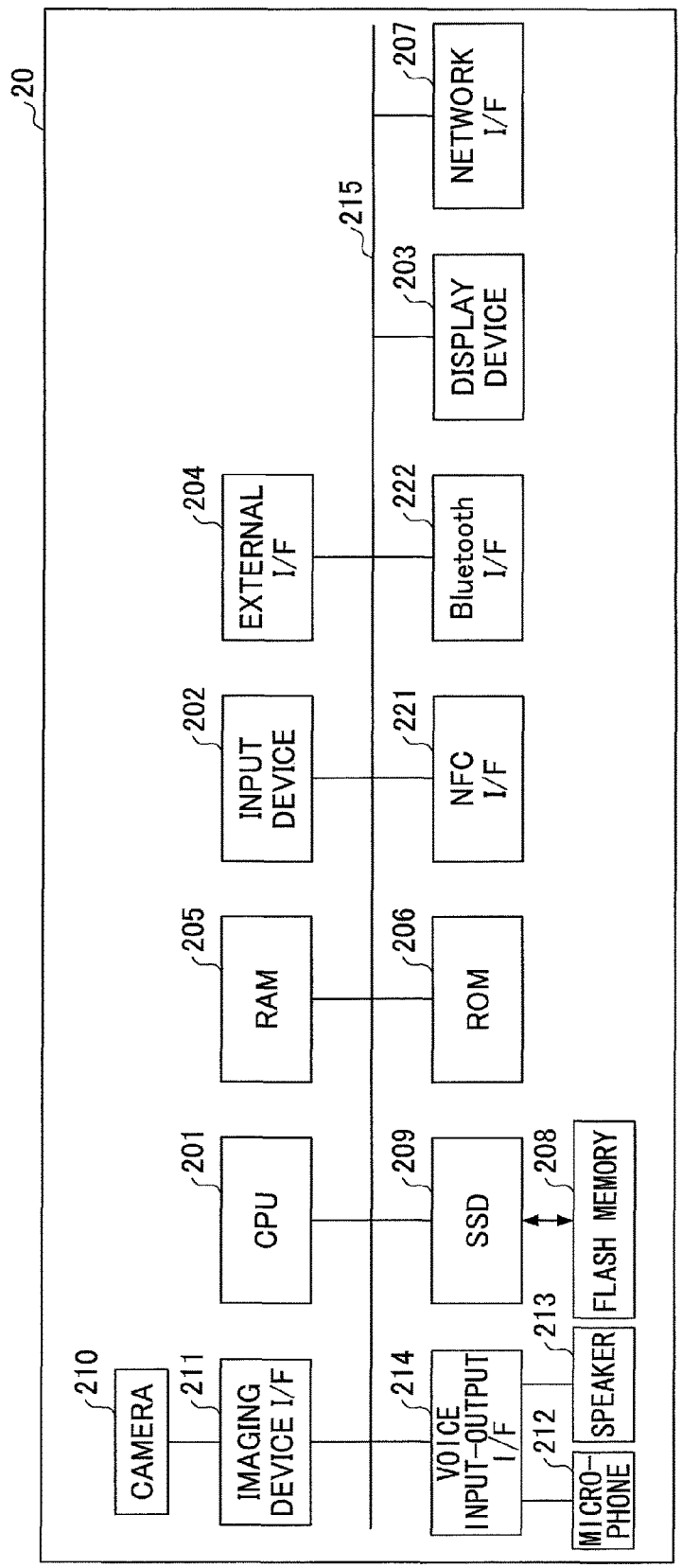
FIG. 8 is a hardware configuration diagram illustrating an example of a mobile terminal.

FIG. 8 is a hardware configuration diagram illustrating a general-purpose terminal 20. As illustrated in FIG. 8, the terminal 20 according to the embodiment includes a CPU 201 configured to control overall operations of the terminal 20, an input device 202 configured to input various types of signals into the terminal 20, a display device 203 configured to display a process result obtained by the terminal 20, an external I/F 204 serving as an interface between various types of external apparatuses such as an external microphone, an external camera, and an external recording medium, and the terminal 20, a RAM 205 utilized as a work area of the CPU 201, a ROM 206 configured to store programs and data such as settings of the OS of the terminal 20 and network settings, a network I/F 207 configured to transmit data by utilizing a mobile phone communications network or the Internet, a flash memory 208 configured to store various types of data such as terminal-specific programs, and an SSD 209 configured to control reading or writing of various types of data with respect to the flash memory 208 in accordance with the control of the CPU 201.

The terminal 20 further includes a built-in camera 210 configured to image a subject to acquire image data in accordance of the control of the CPU 201, an imaging device I/F 211 configured to control driving of the camera 210, a built-in microphone 212 configured to input voice, a built-in speaker 213 configured to output voice, a voice input-output I/F 214 configured to input and output of voice signals between the microphone 212 and the speaker 213 in accordance with the control of the CPU 201, and a bus line such as an address bus or a data bus configured to electrically connect the above-described components. Note that when the terminal 20 utilizes a text chat service alone, the terminal 20 is not necessarily provided with the camera 210, the microphone 212, the speaker 213, and the like.

The terminal 20 may further include one or both of an NFC I/F 221 and a Bluetooth I/F 222.

Further, when the terminal 20 includes a nonvolatile memory configured to read or write data in accordance with the control of the CPU 101, an EEPROM or the like may be used in place of the flash memory 208.

The above-described terminal-specific programs may be distributed in a form of a computer-readable recording medium, such as the recording medium, and the like storing the programs in files of an installable format or an executable format. Alternatively, the above-described terminal-specific programs may be stored in the ROM 206 instead of the flash memory 208.

Management System

Figure 9:
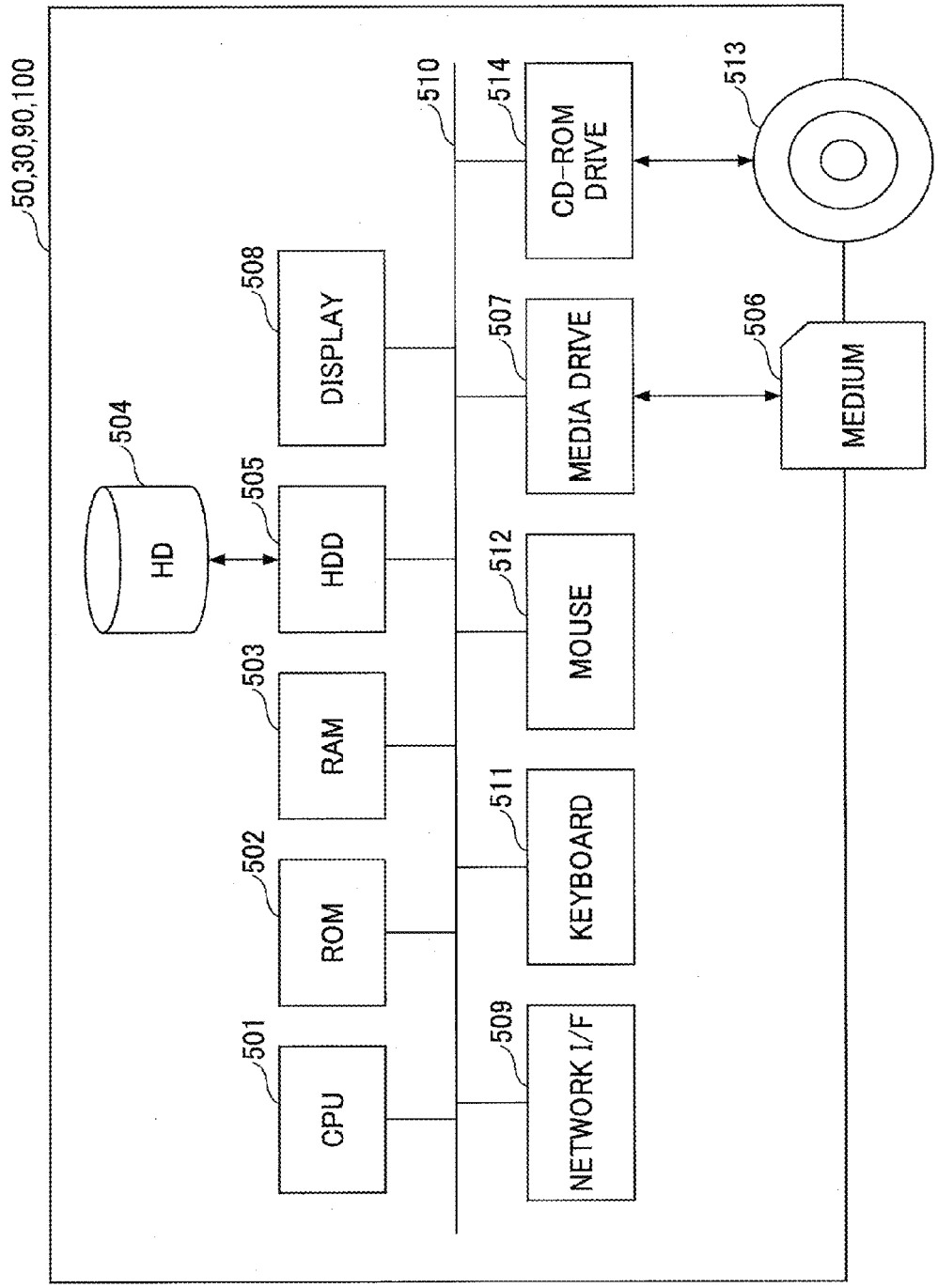
FIG. 9 is a hardware configuration diagram of a transmission management system, a relay apparatus, a program providing system, or a maintenance system.

FIG. 9 illustrates a hardware configuration diagram of a management system. The management system 50 includes a central processing unit (CPU) 501 configured to control overall operations of the management system 50, a read only memory (ROM) 502 configured to store transmission management-specific programs, a random access memory (RAM) 503 configured to serve as a work area of the CPU 503, a hard disk (HD) 504 configured to store various types of data in accordance of the control of the CPU 501, a hard disk drive (HDD) 505 configured to control reading or writing of various types of data with respect to the HD 504 in accordance of the control of the CPU 501, a medium drive 507 configured to control reading or writing (storing) of data with respect to a medium 506 such as flash memory or the like, a display 508 configured to display various types of information such as a cursor, menus, windows, characters, or images, a network I/F 509 configured to perform data transmission using a later-described communications network 2, a keyboard 511 provided with plural keys for inputting characters, numeric values, various types of instructions, and the like, a mouse 512 configured to select and execute various types of instructions, select a process target, and move a cursor, a CD-ROM drive 514 configured to control reading or writing of data with respect to a compact disk read only memory (CD-ROM) 513 as an example of a removable recording medium, and a bus line 510 such as an address bus or a data bus for electrically connecting the above-described components.

Note that the above-described transmission management-specific programs may be distributed in a form of the above-described computer-readable recording medium 506, the CD-ROM 513 and the like storing the programs in files of an installable format or executable format.

The relay apparatus 30 has a hardware configuration similar to that of the management system 50, and hence, a duplicated illustration of the relay apparatus 30 is omitted from the specification. Note that the ROM 502 in the relay apparatus 30 is configured to store relay apparatus-specific programs for controlling the relay apparatus 30. In this case, the relay apparatus-specific programs may be distributed in a form of the above-described computer-readable recording medium 506, CD-ROM 213 and the like storing the programs in files of an installable format or executable format.

The program providing system 90 also has a hardware configuration similar to that of the management system 50, and hence, a duplicated illustration of the program providing system 90 is omitted from the specification. Note that the ROM 502 in the program providing system 90 is configured to store program providing-specific programs for controlling the program providing system 90. In this case, the program providing-specific programs may also be distributed in a form of the above-described computer-readable recording medium 506, CD-ROM 213 and the like storing the programs in files of an installable format or executable format.

The maintenance system 100 has a hardware configuration similar to that of the management system 50, and hence, a duplicated illustration of the maintenance system 100 is omitted from the specification. Note that the ROM 502 in the maintenance system 100 is configured to store maintenance-specific programs for controlling the maintenance system 100. In this case, the maintenance-specific programs may also be distributed in a form of the above-described computer-readable recording medium 506, CD-ROM 213 and the like storing the programs in files of an installable format or executable format.

Note that other examples of the removable computer-readable recording medium include a compact disc recordable (CD-R), a digital versatile disk (DVD), a Blu-ray Disc (BD), and the like, which records the above-described various types of programs for the components of the management system 50 to be ready for distribution.

Functional Configuration

Figure 10:
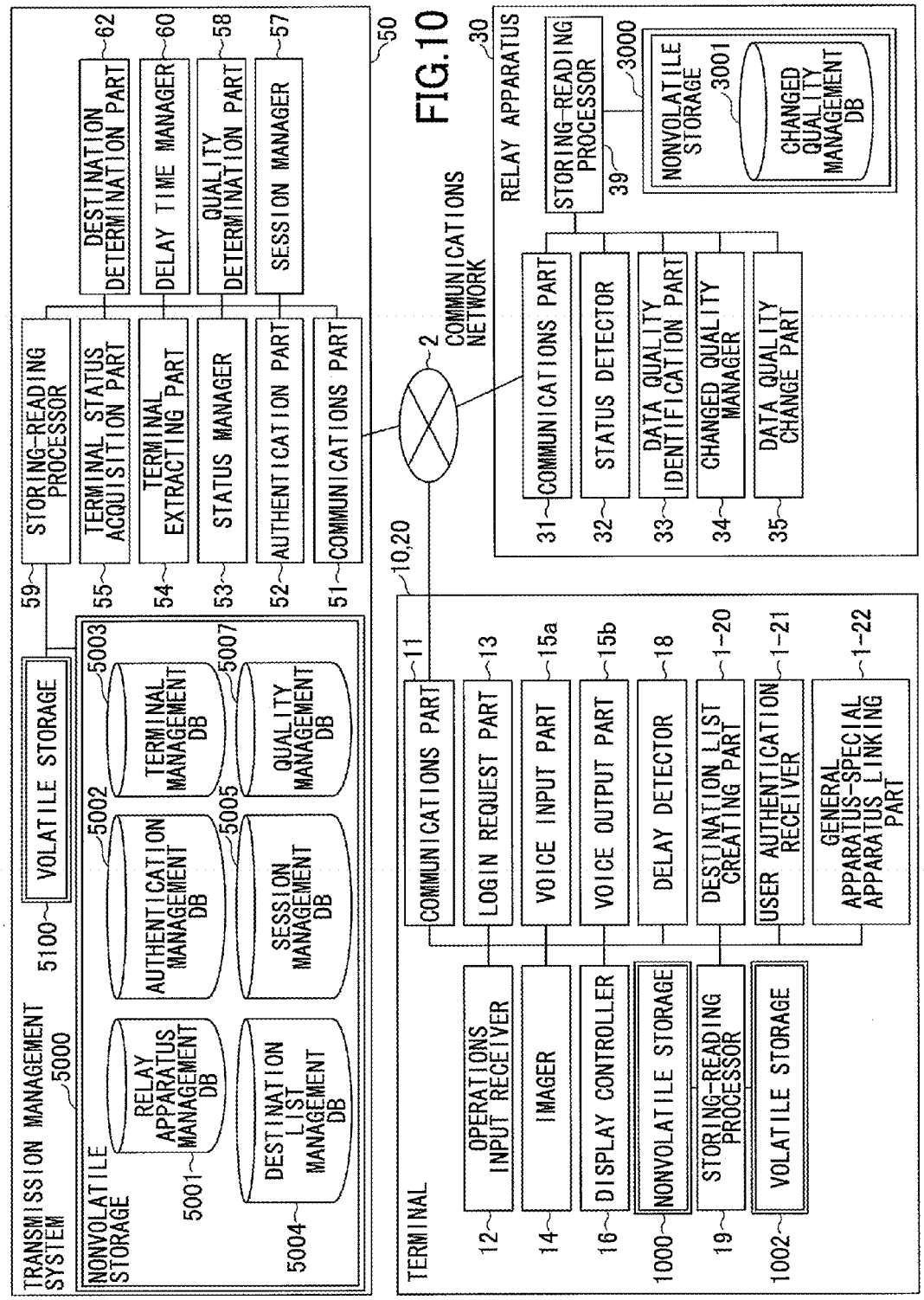
FIG. 10 is a functional block diagram illustrating the terminal, the apparatus, and the system constituting the transmission system.

The following describes functional configurations of the embodiment. FIG. 10 is a functional block diagram illustrating the terminals 10 and 20, the relay apparatus 30, and the management system 50 constituting the transmission system 1 according to the embodiment. As illustrated in FIG. 10, the terminals 10 and 20, the relay apparatus 30, and the management system 50 are connected via the communications network 2 to perform data communications with one another. Note that the program providing system 90 and the maintenance system 100 illustrated in FIG. 6 are not directly related to the communications for use in the TV conference, and an illustration of the program providing system 90 and the maintenance system 100 is therefore omitted from FIG. 10.

Functional Configuration of Terminal

The terminals 10 and 20 each include a communications part 11, an operations input receiver 12, a login request part 13, an imager 14, a voice input part 15a, a voice output part 15b, a display controller 16, a delay detector 18, a storing-reading processor 19, and a destination list creating part 1-20, a user authentication receiver 1-21, and a general apparatus-special apparatus linking part 1-22. These components are functional components or functional parts implemented by causing any one of the components illustrated in FIG. 7 or 8 to execute instructions from the CPU 101 or 201 in accordance with the operations part programs stored in the ROM 102 or 206. The terminals 10 and 20 each further include a volatile storage 1002 formed of the RAM 103 or 205, and a nonvolatile storage 1000 formed of flash memory 104 or 208.

Functional Components of Each Terminal

The following describes details of components of the terminals 10 and 20. The communications part 11 of the terminal 10 or 20 is implemented by the network I/F 111 or 207 illustrated in FIG. 2 or 3, and is configured to perform transmission and reception of various types of data (or information) with other terminals, apparatuses, or systems via the communications network 2.

The communications part 11 starts receiving status information of the terminal 10 or 20 as destination terminal candidates from the management system 50 before the terminal 10 or 20 establishes a session with another terminal 10 or 20 to start the TV conference by call communications.

Note that the destination terminal candidates refer to the terminals 10 or 20 that may be specified by an initiating terminal 10 or 20 as counterparts, that is, session counterparts with which the initiating terminal 10 or 20 performs the TV conference. That is, the initiating terminal 10 or 20 may fail to establish sessions with those terminals that are not set as the destination terminal candidates in advance, and the initiating terminal 10 or 20 thus is not able to hold a TV conference with those terminals. The destination terminal candidates are candidates as counterpart terminals with which the initiating terminal 10 or 20 holds a TV conference, namely, counterpart terminal candidates.

The status information indicates an operating status (an online status or an offline status) of each terminal 10 or 20, and when the terminal 10 or 20 is online (online-status), the status information further indicates a detailed status in the online status; that is, whether the line is busy (engaged) or is in a standby mode (waiting) (hereinafter called a "communications status") when the terminal 10 or 20 is in the online status. The status information further indicates various statuses other than the operating status and the communications status of each terminal 10 or 20, such as statuses in which a cable is disconnected from the terminal 10 or 20, voice is capable of being output but images are incapable of being output, output of voice is set as being disabled (MUTE), and the like. The following illustrates an example of the status information including the operating status and the communications status.

When the initiating terminal 10 or 20 operates as a start request terminal, the communications part 11 transmits start request information to the management system 50. Note that the start request information serves as information that requests starting a session for use in a TV conference. The start request information specifically includes information indicating a request for initiating a TV conference, a terminal ID of the start request terminal serving as a transmission source of the start request information, and a terminal ID that identifies a destination terminal serving as a session counterpart. Note that the terminal ID is information for identifying the terminal 10 or 20.

The user authentication receiver 1-21 is configured to receive authentication information of a user input via the authentication receiving I/F 118.

The operations input receiver 12 includes an operations button 108 and a power switch 109, and is configured to receive various types of inputs from a user. For example, when the user switches the power switch 109 ON, the operations input receiver 12 receives the power ON to turn the power the terminal 10 or 20 ON.

The login request part 13 is implemented by instructions from the CPU 101, and is configured to transmit login request information representing an indication to request logging in, and a current IP address of the terminal 10 from the communications part 11 to the management system 50 via the communications network 101, which is triggered by the reception of the power ON instruction. Further, when the user switches the power switch 109 from the ON-status to an OFF-status, the operations input receiver 12 completely switches the power OFF after the communications part 11 transmits the status information representing an indication to switch the power OFF. Hence, the management system 50 may be able to detect a change from the power ON status to the power OFF status of the power status of the terminal 10.

The imager 14 is implemented by instructions from the CPU 101 or 201, a camera 113 or 210 and an imaging device I/F 113 or 211, and is configured to image a subject to output image data of the subject. The voice input part 15a is implemented by instructions from the CPU 101 or 201, and the voice input-output I/F 116 or 214, and is configured to input voice data associated with voice signals when voice of the user is converted by the microphone 114 or 212 into the voice signals. The voice output part 15b is implemented by the instructions from the CPU 101 or 201, and the voice input-output I/F 116 or 214, and is configured to output the voice signals associated with the voice data to the speaker 115 or 213 to cause the speaker 115 or 213 to output voice.

The display controller 16 is implemented by the display I/F 117 or the like, and is configured to control transmission of image data with respect to an externally attached display 120 or a display device 203. Before the terminal 10 or 20 serving as a request source starts communications of the TV conference with a desired destination terminal 10 or 20, the display controller 16 causes the display 120 or the display device 203 to display a destination list including destination names that reflect status information received after the communications part 11 starts receiving the image data.

The delay detector 18 is implemented by instructions from the CPU 101 or 201, and is configured to detect delay time (ms) of image data or sound-voice data transmitted from another terminal 10 or 20 via the relay apparatus 30.

The storing-reading processor 19 is implemented by instructions from the CPU 101 or 201, and the SSD 105 or 209 as an example, and is configured to store various types of data in the nonvolatile storage 1000, and read various types of data from the nonvolatile storage 1000. The nonvolatile storage 1000 stores terminal IDs (identification) for identifying the terminals 10 or 20, associated passwords, and the like. The storing-reading processor 19 stores various types of data in the volatile storage 1002 or reads various types of data from the volatile storage 1002. The volatile storage 1002 stores content data received when the terminal 10 performs communications with the destination terminal, and overwrites the stored content data every time the volatile storage 1002 receives the content data. Among these data, images based on the image data before being overwritten are displayed by the display 120 or the display device 203, and sounds based on the sound data before being overwritten are output by the speaker 115 or 213.

The destination list creating part 1-20 is configured to create and update an address list indicating statuses of the destination candidates with icons, based on the later-described destination list information and the status information of the terminals 10 or 20 serving as the later-described destination candidates.

The destination list creating part 1-20 in this embodiment specifically generates the destination list relating to the corresponding user from the destination list information of the user under the following conditions; where the terminal 10 or 20 is in a login state in the transmission management system 50, the display 120 or the like displays the destination list relating to the terminal 10 or 20, the user who uses the terminal 10 or 20 inputs authentication information via the authentication receiving I/F 118, and receives the destination list information based on the user from the transmission management system 50. The display controller 16 updates the destination list relating to the terminal 10 or 20 displayed on the display 120 or the like with a newly created destination list relating to the user.

Further, the destination list creating part 1-20 generates the destination list relating to another user from the destination list information of this user under the following conditions; where the user is in a login state in the transmission management system 50, the display 120 or the like displays the destination list based on the user, a different user who uses the terminal 10 or 20 inputs authentication information via the authentication receiving I/F 118, and receives the destination list information based on the different user from the transmission management system 50. The display controller 16 updates the destination list relating to the former user displayed on the display 120 or the like with a newly created destination list relating to the latter (different) user.

The general apparatus-special apparatus linking part 1-22 is configured to control a process associated with linking between the special-purpose apparatus serving as the terminal 10 and the general-purpose apparatus serving as the terminal 20. More specifically, the general apparatus-special apparatus linking part 1-22 links the terminal 20 and one of the terminals 10 in advance (pairing) by the user's operations, and when the terminal 20 receives an incoming call from a counterpart terminal 10, the general apparatus-special apparatus linking part 1-22 performs control to start a TV conference on the terminal 10 based on the instructions from the terminal 20. Further, the general apparatus-special apparatus linking part 1-22 links the terminal 20 and one of the terminals 10 by the user's operations when receiving an outgoing call based on the destination list (address book) from the terminal 20, and performs control to cause the terminal 10 to transmit the outgoing call to a counterpart terminal to start a TV conference.

The general-purpose apparatus 20 may also perform a TV conference by transmitting the outgoing call or receiving the incoming call in a manner similar to the special-purpose apparatus 10; however, the use of the special-purpose apparatuses 10 may still be advantageous in terms of performance of cameras, displays, speakers and the like. A substantial number of users may desire to use the special-purpose apparatuses 10 to conduct the TV conference or the like when the special-purpose apparatuses 10 are located nearby. The use of the individual accounts to operate the special-purpose apparatus 10 is generally susceptible to risk of exposing the destination lists of the individuals to a third party or may allow a third party to perform unauthorized operations using the individual accounts of the users when the users are away from their seats. However, the above-described collaboration between the special-purpose apparatus 10 and the general-purpose apparatus 20 enables the user to operate the special-purpose apparatus 10 using the individual accounts of the users to perform a TV conference with high security.

Functional Configuration of Relay Apparatus

Next, an illustration is given of functions and processes performed by the relay apparatus 30. The relay apparatus 30 includes a communications part 31, a status detector 32, a data quality identification part 33, a changed quality manager 34, a data quality change part 35, and a reading-storing processor 39. These components are functional components or functional parts implemented by causing any one of the components illustrated in FIG. 9 to execute instructions from the CPU 501 in accordance with the operations part programs stored in the ROM 502. The relay apparatus 30 is composed of the HD 504, and includes a nonvolatile storage 3000 capable of maintaining various types of data and information even though the power of the relay apparatus 30 is switched OFF.

The nonvolatile storage 3000 includes a changed quality management database (DB) 3001 composed of a changed quality management table. Note that the changed quality management table is configured to manage IP addresses of the terminals 10 or 20 as relay destinations of relaying the image data in association with an image quality of the image data relayed by the relay apparatus 30 to the relay destinations.

Functional Components of Relay Apparatus

The following describes functional configurations of the relay apparatus 30. Note that in the following, an illustration is also given of a relationship with main components for implementing the functions of the relay apparatus 30.

The communications part 31 of the relay apparatus 30 is implemented by the network I/F 509, and is configured to perform transmission and reception of various types of data (or information) with other terminals, apparatuses, or systems via the communications network 2. The status detector 32 is implemented by instructions from the CPU 501, and is configured to detect an operating status of the relay apparatus 30 having the status detector 32. The operating status includes an "online" status, an "offline" status, and a "failure" status.

The data quality identification part 33 is implemented by instructions from the CPU 501, and is configured to search the changed quality management table by the IP address of the destination terminal as a search key and extract the image quality of the corresponding relaying image data to identify the image quality of the relaying image data. The changed quality manager 34 is implemented by instructions from the CPU 501, and is configured to change content of the changed quality management table of the changed quality management DB 3001, based on the later-described quality information transmitted from the management system 50.

The data quality change part 35 is implemented by instructions from the CPU 501, and is configured to change the image quality of the image data transmitted from the terminal 10 or 20 serving as a transmission source based on the content of the changed quality management table of the changed quality management DB 3001. The storing-reading processor 39 is implemented by the HDD 505, and is configured to store various types of data in the nonvolatile storage 3000, and read various types of data from the nonvolatile storage 3000.

Functional Configuration of Management System

The following describes functions and processes performed by the management system 50. The management system 50 includes a communications part 51, an authentication part 52, a status manager 53, a terminal extracting part 54, a terminal status acquisition part 55, a session manager 57, a quality determination part 58, a storing-reading processor 59, a delay time manager 60, and a destination determination part 62. These components are functional components or functional parts implemented by causing any one of the components illustrated in FIG. 9 to execute instructions from the CPU 501 in accordance with the operations part programs stored in the ROM 502. The transmission management system 50 includes a nonvolatile storage 5000 composed of the HD 504 capable of maintaining various types of data and information even though the power of the transmission management system 50 is switched OFF. The nonvolatile storage 5000 is configured to store various types of information. The transmission management system 50 further includes a volatile storage 5100 composed of the RAM 503 illustrated in FIG. 503.

Relay Apparatus Management Table

The nonvolatile storage 5000 includes the relay apparatus management DB 5001 composed of the relay apparatus management table. The relay apparatus management table is configured to manage operating statuses of the relay apparatuses 30, received dates and times of the status information indicating the operating statuses received by the management system 50, IP addresses of the relay apparatuses 30, and the maximum data transmission rates (Mbps) of the relay apparatuses 30 in association with respective relay apparatus IDs identifying the relay apparatuses 30.

Authentication Management Table

The nonvolatile storage 5000 further includes an authentication management DB 5002 composed of an authentication management table illustrated in FIG. 11. The authentication management table is configured to manage the terminal IDs of all the terminals 10 and 20, or the user IDs of all the users who use the terminals 10 and 20 in association with respective passwords. The terminal IDs are information for identifying the terminals 10 and 20, the user IDs are information for identifying the users. The passwords are information used for authenticating the terminals 10 and 20 or the users. Note that the terminal ID and the user ID may be generically called an ID. In the authentication management table illustrated in FIG. 11, a password for the terminal ID "10aa" of the terminal or the user is "aaaa".

The IDs indicate identification information such as a language, characters, symbols, or various types of marks used for uniquely identifying each transmission terminal 10 or 20, or a user of the transmission terminal 10 or 20. Further, the ID may be identification information composed of a combination of at least two of the above language, characters, symbols, and marks. The terminal ID may include identification information for identifying a user.

Terminal Management Table

The nonvolatile storage 5000 includes a terminal management DB 5003 composed of a terminal management table illustrated in FIG. 12. The terminal management table is configured to manage the terminal names, the operating statuses of the terminals 10 and 20, date and time of the later-described login request information received by the transmission management system 50, and the IP addresses of the terminals 10 and 20 in association with the terminal IDs of the terminals 10 and 20.

Note that the operating status includes an online status in which the power is switched on and the terminal is in a standby mode capable of performing communications or in a busy mode currently performing communications, and an offline status in which the power is not switched on to indicate that the terminal is not in the standby mode and is incapable of performing communications. In the terminal management table illustrated in FIG. 12, the terminal 10aa having the terminal ID "10aa" has the terminal name of "AA Terminal, Tokyo Office, Japan", the operating status of "Online", the date and time at which the management system 50 has received the login request information of "10 Nov. 2009. 13:40" (i.e., Nov. 10, 2009, 13:40), and the IP address of the terminal 10aa of "1.2.1.3".

Destination List Management Table

The nonvolatile storage 5000 further includes a destination list management DB 5004 composed of a destination list management table illustrated in FIG. 13. The destination list management table is configured to manage start request terminal IDs of the terminals 10 and 20 serving as request sources of the session start request information for use in the TV conference including call communications managed by the management system 50 in association with the terminal IDs of the terminals 10 and 20 identifying destination terminal candidates serving as destination candidates to which content data are transmitted from the request source terminals 10 and 20, or IDs such as user IDs and the like of the terminals 10 and 20. As illustrated in the destination list management table illustrated in FIG. 13, destination terminal candidates to which a terminal (a terminal 10aa) having the terminal ID "10aa" is capable of transmitting a TV conference start request are, for example, a terminal 10ab having the terminal ID "10ab", a terminal 10ac having the terminal ID "10ac", a terminal 10ad having the terminal ID "10ad", and a terminal 10ae having the terminal ID "10ae". These destination terminal candidates in the destination list management table may be updated by transmitting an addition request or a deletion request from the start request terminal to the management system 50.

Session Management Table

The nonvolatile storage 5000 further includes a session management DB 5005 composed of a session management table. The session management table is configured to manage the relay apparatus IDs for use in relaying content data in the respective sessions, the terminal IDs of start request terminals serving as transmission sources of the session start request information, the terminal IDs of the destination terminals specified as communication counterparts in the session start information, delay times (ms) in receiving the image data in the destination terminals, and received dates and times at which the management system 50 has received delay information including delay times transmitted from the destination terminals in association with the respective session IDs for identifying different sessions for transmitting content data between the terminals.

Quality Management Table

The nonvolatile storage 5000 includes a quality management DB 5007 composed of a quality management table. The quality management table is configured to manage the image quality (the quality of an image) of the image data relayed by the relay apparatus 30 based on the delay times (ms) of the image data in the start request terminals or the destination terminals.

Functional Components of Management System

The following describes detailed functional components of the management system 50. Note that in the following, an illustration is also given of a relationship with main components illustrated in FIG. 9 for implementing the functions of the management system 50.

The communications part 51 is implemented by the network I/F 509, and is configured to perform transmission and reception of various types of data (or information) with other terminals, apparatuses, or systems via the communications network 2. The authentication part 52 searches the authentication management table of the nonvolatile storage 5000 by the terminal ID or the user ID, and its corresponding password included in the login request information received via the communications part 51 as a search key, and authenticates the terminal 10 or 20, or the user based on the determination as to whether the identical terminal ID (or the user ID) and its corresponding password are managed in the authentication management table.

The status manager 53 is configured to manage an operating status of a terminal management table. The status manager 53 is configured to manage the operating statuses of the login requested terminals 10 or 20 (the login request terminals) in the terminal management table to store the terminal IDs of the login request terminals 10 or 20 in association with the operating statuses of these login request terminals 10 or 20, received dates and times at which the management system 50 has received the login request information, and the IP addresses of the login request terminals 10 or 20. When the user of the terminal 10 or 20 switches the power switch 109 of the terminal 10 or 20 from an OFF status to ON status to transmit information indicating the power of the terminal 10 or 20 to be turned ON, the status manager 53 receives the power ON information from the terminal 10 or 20, and sets the operating status indicating "offline" in the terminal management table into "online", based on the received power ON information transmitted from the terminal 10 or 20. When the user of the terminal 10 switches the power switch 109 of the terminal 10 or 20 from an ON status to OFF status to transmit information indicating the power of the terminal 10 or 20 to be turned OFF, the status manager 53 receives the power OFF information from the terminal 10 or 20, and sets the operating status indicating "online" in the terminal management table into "offline", based on the received power OFF information transmitted from the terminal 10 or 20.

When the communications part 51 receives the change request information transmitted by the start request terminal or the destination terminal in the TV conference start request information, the status manager 53 appropriately changes the operating status of at least one of the start request terminal and the destination terminal in the terminal management table.

The terminal extracting part 54 is configured to search the destination list management table by an ID, that is, the terminal ID of a target terminal subjected to processing such as the login request terminal 10 or 20, or the user ID of the user as a search key, to read the terminal IDs of the destination terminal candidates capable of communicating with the target terminal, that is, the terminal IDs of the destination terminal candidates with which the target terminal 10 may establish a session, and to extract the terminal IDs of the destination terminal candidates capable of communicating with the target terminal. Specifically, the terminal extracting part 54 reads the terminal ID of the destination terminal candidate in association with the terminal ID of the start request terminal that matches the terminal ID of the target terminal.

The terminal extracting part 54 searches the destination list management table by the terminal ID of the target terminal as a key to extract the terminal IDs of other terminals 10 and 20 that have registered the terminal ID of the target terminal as a destination terminal candidate. Specifically, the terminal extracting part 54 reads from the destination list management table the terminal ID of the start request terminal in association with the terminal ID of the destination terminal candidate that matches the terminal ID of the target terminal.

The terminal status acquisition part 55 searches the terminal management table by the ID as a search key to read the operating status for each of IDs. The terminal status acquisition part 55 may thus be able to acquire the operating status of the destination terminal candidate capable of communicating with the login request terminal 10 or 20. The terminal status acquisition part 55 also searches the terminal management table to acquire the operating status of the login request terminal.

The session manager 57 is configured to manage the session management table of the nonvolatile storage 5000 to store the session IDs generated by a session ID generator in association with the terminal IDs of the request source terminals, and the terminal IDs of the destination terminals. The session manager 57 also manages the session IDs stored in the session management table in association with the relay apparatus ID of one of the relay apparatuses 30 finally selected for each of the session IDs.

The quality determination part 58 is configured to search the quality management table by the delay time as a search key to extract the image quality of the corresponding image data to determine the image quality of the image data to be relayed by the relay apparatus 30. The storing-reading processor 59 is implemented by the HDD 505, and is configured to store various types of data in the nonvolatile storage 5000, and read various types of data from the nonvolatile storage 5000. The storing-reading processor 59 stores various types of data in the volatile storage 5100 or reads various types of data from the volatile storage 5100.

The delay time manager 60 is configured to manage delay time indicated in the delay information by searching the terminal management table by the IP address of the above destination terminal as a search key to extract the terminal ID corresponding to the IP address of the destination terminal, and further storing a delay time indicated in the delay information in a field part of the delay time in the record that includes the extracted terminal ID in the session management table.

The destination determination part 62 is configured to refer to the destination list management table and determine whether the destination terminal ID of the terminal 10 or 20 that attends content data session sed extracted by the terminal extracting part 54 includes the destination terminal ID of the attendance request terminal 10 or 20.

Operations

Activation of Terminal

Figure 14:
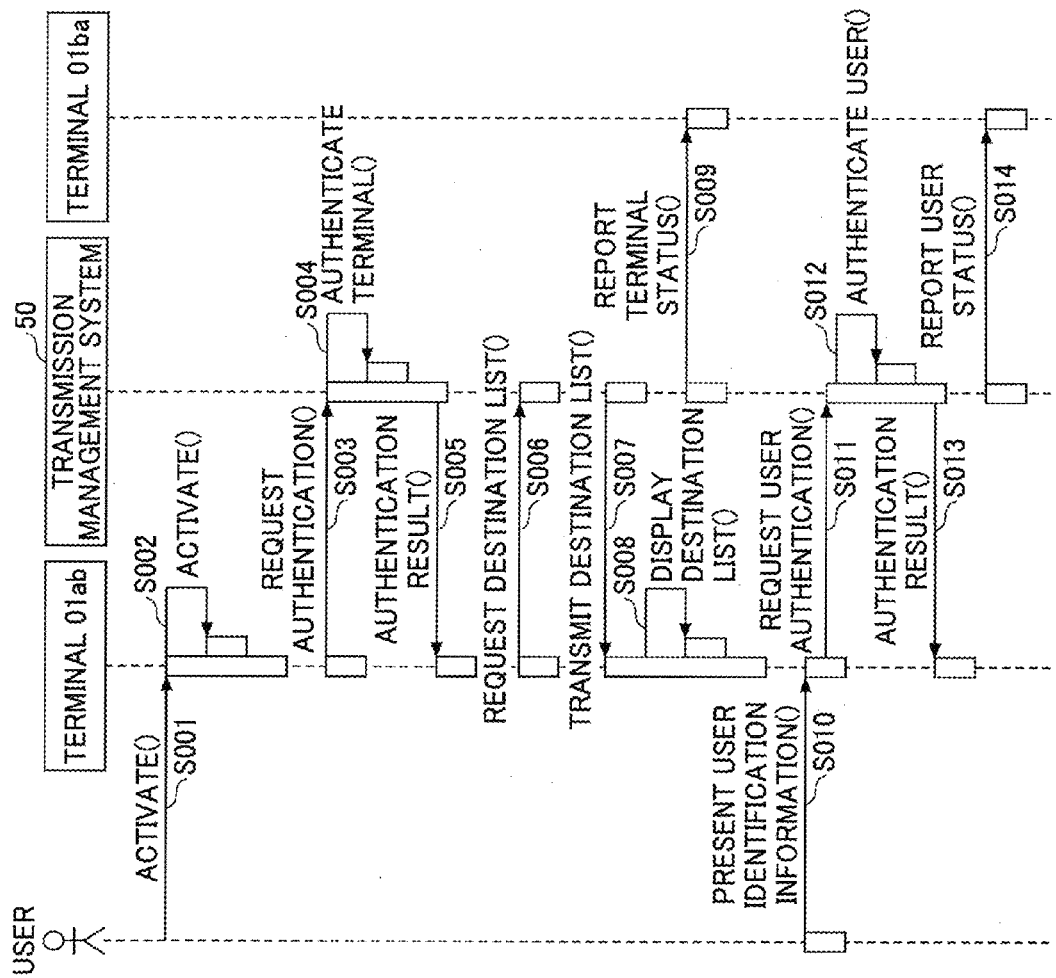
FIG. 14 is a sequence diagram illustrating a process example upon activation of the terminal.

FIG. 14 is a sequence diagram illustrating a process example of a terminal at activation, which mainly illustrates a shared client terminal serving as a special-purpose apparatus at activation.

As illustrated in FIG. 14, when a user switches the power button ON of a terminal 01*ab* to activate the terminal 01*ab* (step S001), the terminal 01*ab* performs an activation process (step S002).

The terminal 01*ab* subsequently transmits an authentication request based on a shared account set in advance with respect to the transmission management system 50 (step S003). The transmission management system 50 then performs terminal authentication (step S004), and transmits a response of an authentication result to the terminal 01*ab* (step S005).

When the authentication is performed normally, the terminal 01*ab* subsequently transmits a destination list request to the transmission management system 50 (step S006), and the transmission management system 50 transmits a destination list (step S007). The terminal 01ab subsequently displays the destination list on a screen (step S008). The transmission management system 50 transmits a status report of the terminal 01ab to another terminal 01ba (step S009).

When the user performs a login operation or the like by presenting (using) identification information of the user's individual account to the terminal 01ab (step S010), the terminal 01ab transmits a user authentication request to the transmission management system 50 (step S011). Note that the user may also allow to use the transmission management system 50 by presenting effective user identification information without a login process, in addition to performing the login operation by presenting the user identification information.

Upon reception of the user authentication request, the transmission management system 50 performs user authentication (step S012), and subsequently transmits a response of an authentication result to the terminal 01ab (step S013). The transmission management system 50 also transmits a status report of the user to another terminal 01ba (step S014).

On the other hand, an individual client terminal 20 serving as a general-purpose apparatus does not perform steps S001 to S009. The individual client terminal 20 only performs steps S010 to S014.

Note that the following illustration simplifies illustration of the activation process of the terminal because details of the process have already described with reference to FIG. 14.

Outgoing Call

Figure 15:
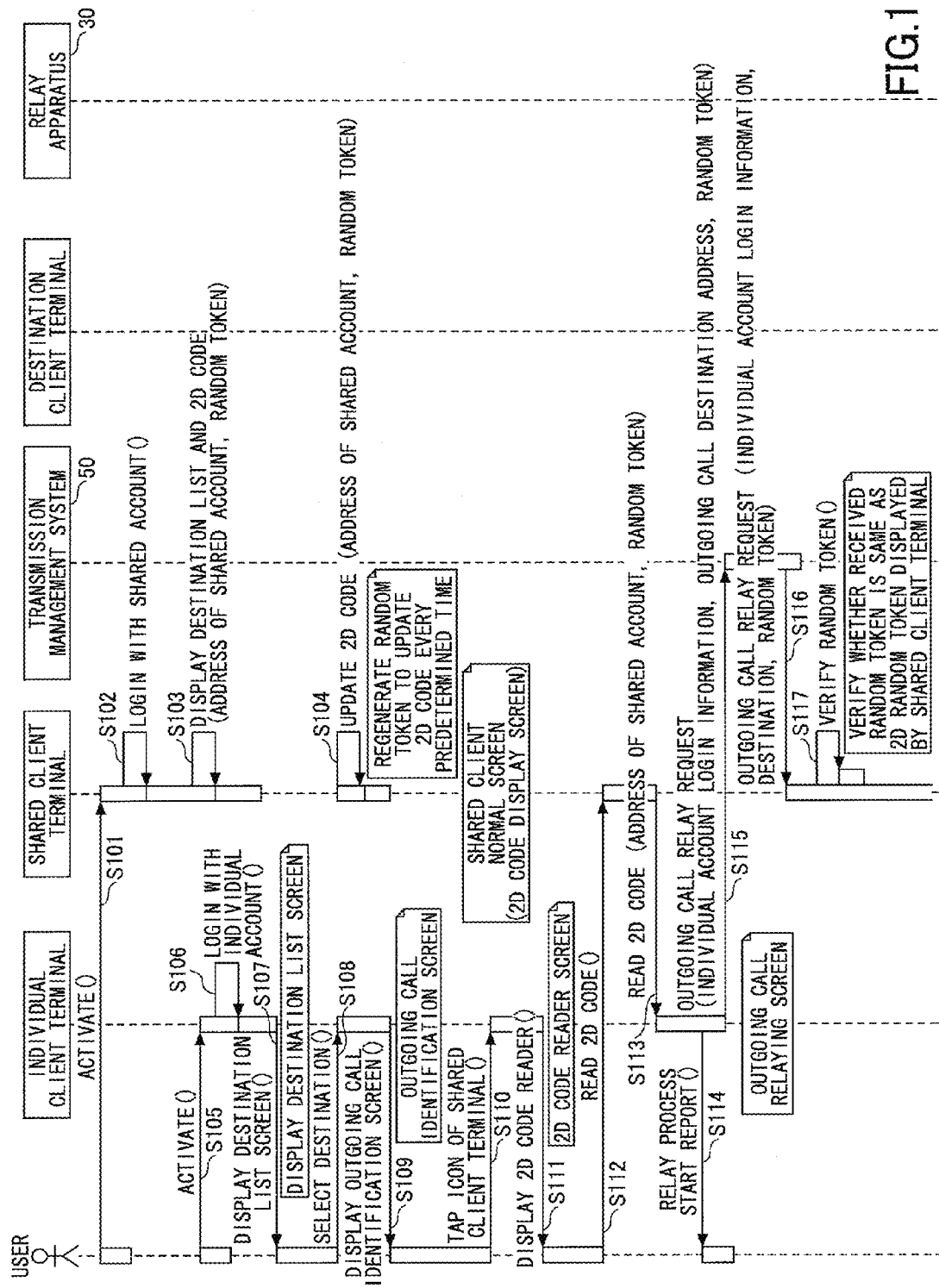
FIG. 15 is a sequence diagram illustrating a process example of selecting a destination from an individual client terminal, and calling the destination from a shared client terminal (1)
Figure 16:
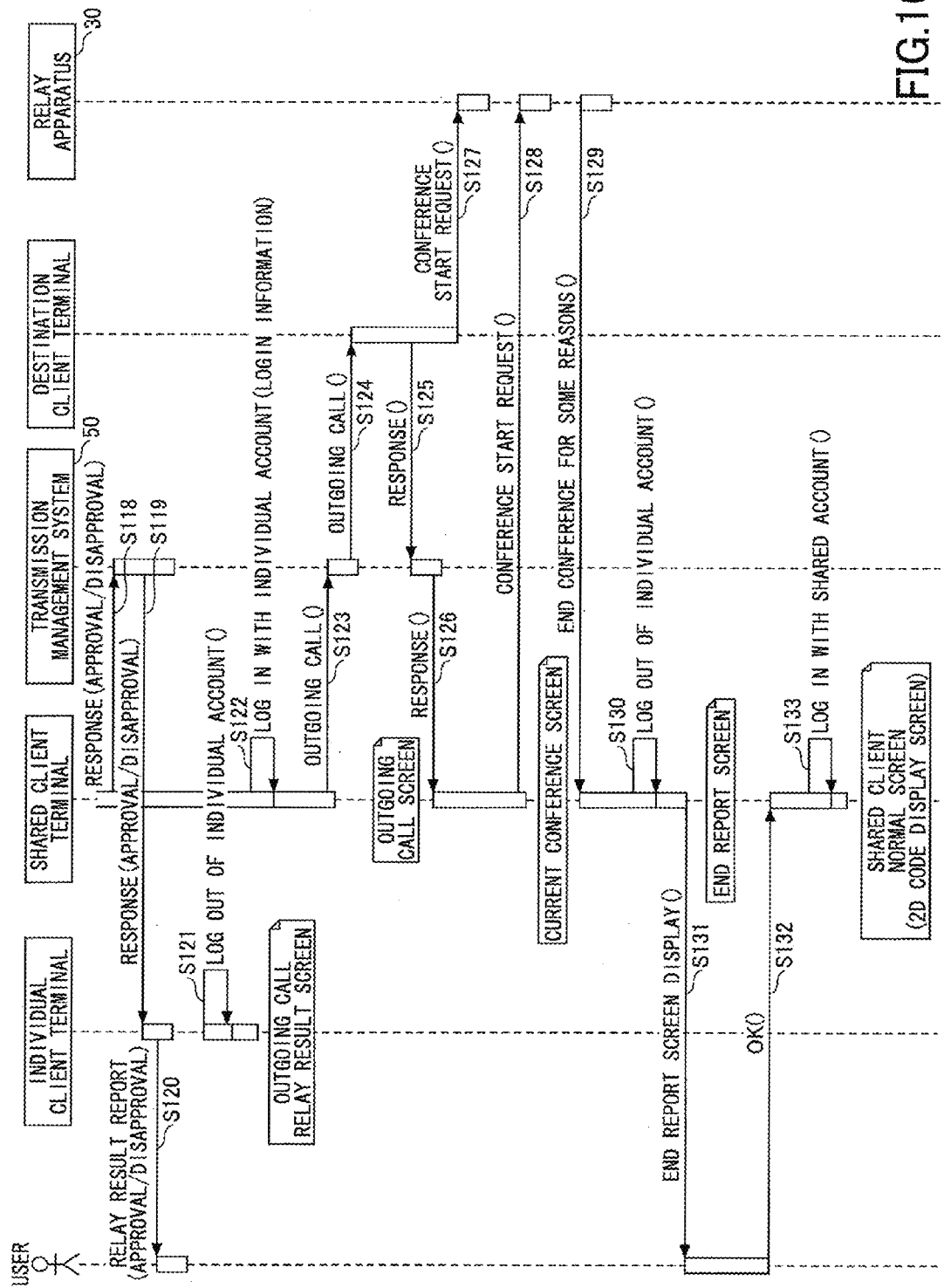
FIG. 16 is a sequence diagram illustrating a process example of selecting a destination from an individual client terminal, and calling the destination from a shared client terminal (2)

The following illustrates a process in which the user who uses the individual client terminal 20 with the individual account performs operations on the individual client terminal 20 to select a destination from a destination list (address book) to call the destination, and subsequently desires to use the shared client terminal 10 to perform an operation to transmit an outgoing call to the selected destination (a destination receiving an incoming call) to hold a TV conference. USING 2D code FIG. 15 and FIG. 16 are sequence diagrams illustrating process examples of selecting a destination from the individual client terminal 20, and calling the destination from the shared client terminal 10. Specifically, the process examples illustrates a process of linking an individual client terminal 20 and a shared client terminal 10 using a two-dimensional code (hereinafter abbreviated as "2D-dode") such as QR code (registered trademark).

In FIG. 15, a user initially activates the individual client terminal 20 and the shared client terminal 10 (steps S101 and S105). The individual client terminal 20 and the shared client terminal 10 subsequently perform login processes with respective accounts (steps S102 and S106) to display destination lists (steps S103 and S107).

Figure 17:
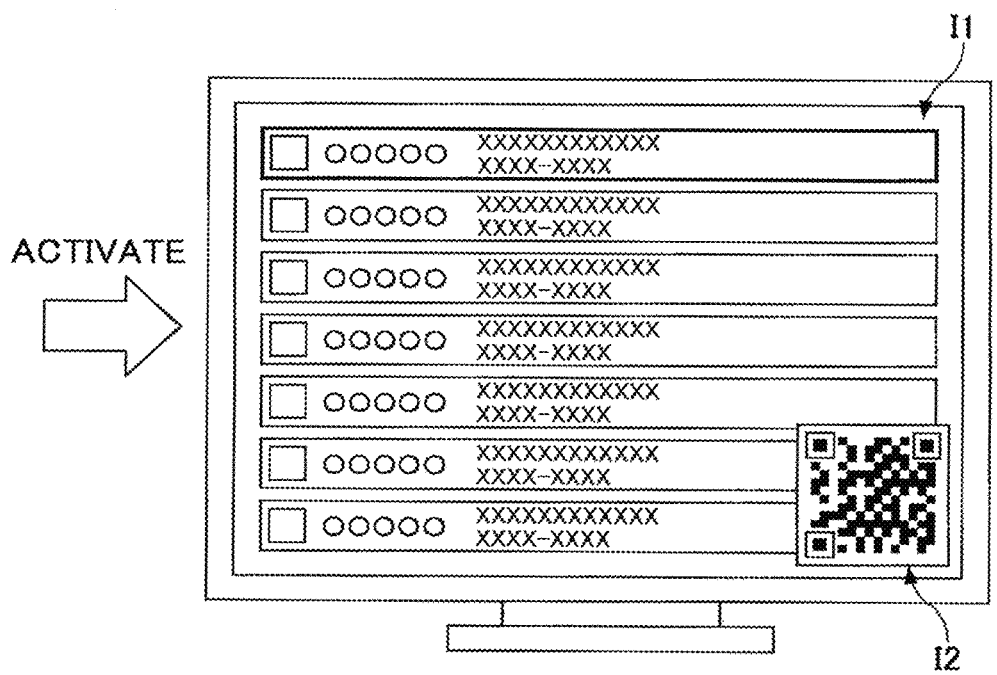
FIG. 17 is a diagram illustrating an example of a screen displaying a destination list and a two-dimensional code.

Note that the shared client terminal 10 also displays a two-dimensional code (2D code) that includes information specifying its own terminal (the shared client terminal 10) in addition to the destination list (step S103). FIG. 17 illustrates an example of the shared client terminal 10 that displays the destination list I1 and the 2D code I2 on a screen of the shared client terminal 10.

Figure 18:
FIG. 18 is a diagram illustrating an example of data embedded in the two dimensional code.

FIG. 18 illustrates an example of data embedded in the 2D code. The 2D code includes a URL of the Web access for being read by the general-purpose application T2-4, an address of the shared client terminal 10 as a parameter part, a random token, and optionally a public key (a public key is omitted from the process example of FIG. 15). Note that the URL of the Web access may be replaced with a description for activating a conference-specific application as illustrated in FIG. 3B.

In FIG. 18, the address is used by the individual client terminal 20 to transmit a message to the shared client terminal 10.

The random token is used to prevent the user from storing the 2D code displayed by the shared client terminal 10 and reusing the displayed 2D code. The individual client terminal 20 transmits such a random token together with the message when transmitting the message to the shared client terminal 10, and the shared client terminal 10 may be able to verify whether the transmitted random token matches the latest one, thereby preventing the 2D code from using reused.

The public key is used to encrypt the message transmitted from the individual client terminal 20 to the shared client terminal 10. The message that the individual client terminal 20 transmits to the shared client terminal 10 includes important information for permitting the user to use a service with the individual account, and hence, the message is encrypted with a public key in order to prevent content of the message from being read by terminals or the like other than the shared client terminal 10 of the communication counterpart.

In FIG. 15, the shared client terminal 10 periodically changes a random token to update the random token (step S104). This step is performed to prevent the 2D code from being reused.

When the user operates the individual client terminal 20 to select a calling destination from the destination list (step S108), display an outgoing call identification screen (step S109), and tap an icon of the shared client terminal 10 (step S110), the individual client terminal 20 activates a 2D code reader (step S111).

FIGS. 19A to 19E illustrate examples of operations performed on the individual client terminal 20. FIG. 19A illustrates an operation status of selecting "Mr. A" from the destination list, FIG. 19B illustrates an operation status of selecting "start a conference by the shared client terminal" from operation statuses of selecting "start normal conference", "start a conference by the shared client terminal" (i.e., an icon of the shared client terminal 10), and "cancel" with respect to a destination "Mr. A". FIG. 19C illustrates an activation status of the 2D code reader.

Referring back to FIG. 15, when the user uses the 2D code reader to read 2D code displayed on the screen of the shared client terminal 10 (step S112), the individual client terminal 20 acquires a terminal address of the shared client terminal 10 and a random token (step S113).

The individual client terminal 20 subsequently displays a relay process start report to the user (step S114), and transmits authentication information (e.g., login information) for using the TV conference service with the individual account, an outgoing call destination elected by the user, and a random token as an outgoing call relay request to the address of the shared client terminal 10 via the transmission management system 50 (step S115). In this state, the individual client terminal 20 displays an outgoing call relaying screen illustrated in FIG. 19D.

Referring back to FIG. 15, when the shared client terminal 10 receives the outgoing call relay request from the individual client terminal 20 via the transmission management system 50 (step S116), the shared client terminal 10 verifies whether the random token included in the message is the same as the random token currently displayed by the shared client terminal 10 itself (step S117).

In FIG. 16, when the random token included in the message is the same as the random token currently displayed by the shared client terminal 10 itself, the shared client terminal 10 transmits an approval message to the individual client terminal 20 via the transmission management system 50, whereas when the random token included in the message is not the same as the random token currently displayed by the shared client terminal 10 itself, the shared client terminal 10 transmits a disapproval message to the individual client terminal 20 via the transmission management system 50 (steps S118 and S119).

The individual client terminal 20 receives a response from the shared client terminal 10, and displays to the user whether the outgoing call relay request is approved or disapproved (step S120). When the outgoing call relay request is approved, the individual client terminal 20 logs out of the individual account simultaneously (step S121). FIG. 19E illustrates an example of an outgoing call relay result screen.

Referring back to FIG. 16, when the outgoing call relay request is approved, the shared client terminal 10 performs a login process with the individual account using the authentication information for using the TV conference service with the individual account (step S122).

When the shared client terminal 10 succeeds in the login with the individual account, the shared client terminal 10 subsequently calls the outgoing call destination that is selected by the user and is included the outgoing call relay request (step S123). When the transmission management system 50 receives a call from the shared client terminal 10 with the individual account, the transmission management system 50 calls a destination client terminal 10 or 20 (step S124). When the transmission management system 50 receives a response to the call (step S125), the transmission management system 50 reports the response to the shared client terminal 10 (step S126), and transmits a conference start request to the relay apparatus 30 (step S127).

When the response to the call is accepted and the outgoing call is successful, the shared client terminal 10 transmits a conference start request to the relay apparatus 30 (step S128), and shifts the screen to the conference screen to start a TV conference with the destination client terminal.

When the conference ends for some reasons, and the relay apparatus 30 reports the end of the conference to the shared client terminal 10 (step S129), the shared client terminal 10 logs out of the individual account (step S130), and displays an end report to the user (step SS131).

When the user identifies the end report (presses "OK") (step S132), the shared client terminal 10 logs in with the shared account (step S133), and displays the destination list of the shared account.

Pre-Pairing for Awaiting Incoming Call from Counterpart

A pre-pairing process is performed in the following case. A user who uses an individual client terminal 20 with an individual account desires to use the individual client terminal 20 until responding to an incoming call addressed to the individual account received from a counterpart (calling source), and to use, after responding to the incoming call, a shared client terminal 10 to perform a TV conference with the counterpart.

FIG. 20 is a sequence diagram illustrating a process example of pairing. Specifically, the process example illustrates a process of linking an individual client terminal 20 with a shared client terminal 10 using a two-dimensional code such as QR code.

As illustrated in FIG. 20, when the shared client terminal 10 is activated (step S1101), the shared client terminal 10 logs in with a shared account in the activating process to display a destination list relating to the shared client terminal 10.

Figure 21:
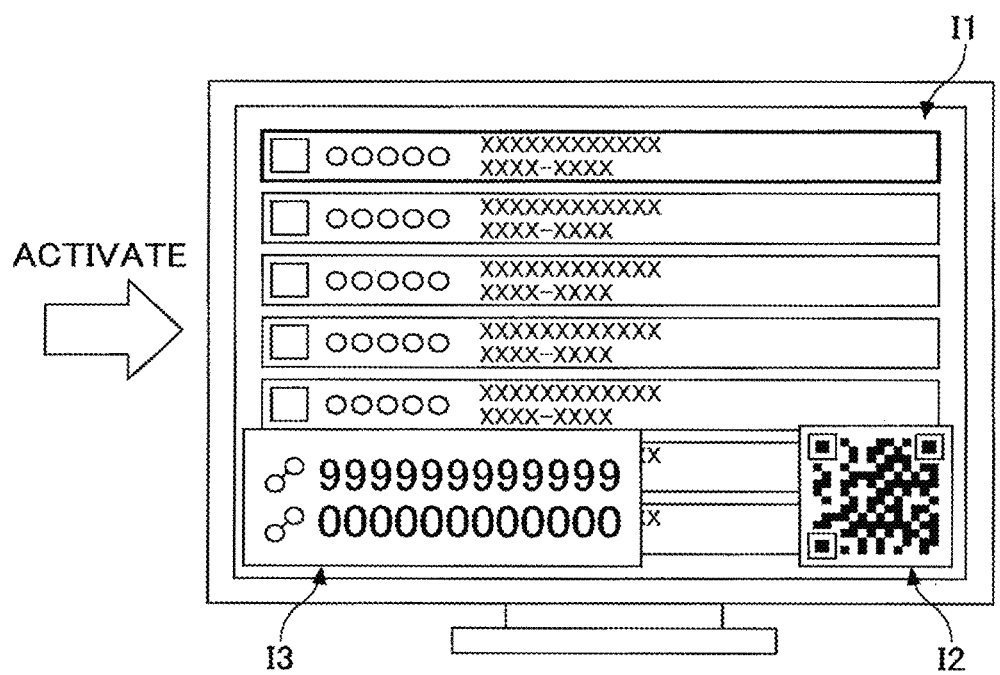
FIG. 21 is a diagram illustrating an example of a screen displaying a destination list and a two-dimensional code.

The shared client terminal 10 also displays a 2D code including information that specifies an own terminal of the shared client terminal 10 (step S1102). FIG. 21 illustrates an example of the shared client terminal that displays the destination list I1 and the 2D code I2 on a screen of the shared client terminal 10. The shared client terminal 10 may also display, though not being mandatory, on the screen an ID list I3 of individual client terminals 20 that are currently paired with the shared client terminal 10.

Figure 22:
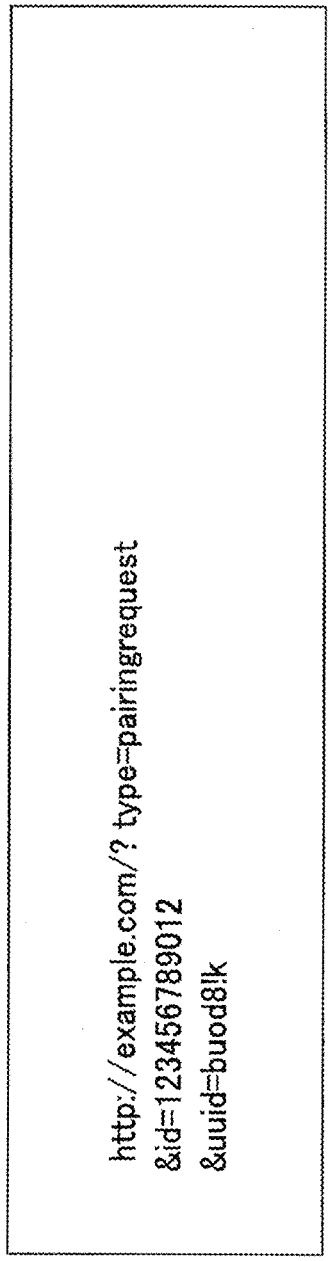
FIG. 22 is a diagram illustrating an example of data embedded in the two dimensional code.

FIG. 22 illustrates an example of data embedded in the 2D code. This 2D code includes a URL of the Web access read by the general-purpose application T2-4, and "type", "id", and "uuid" of a parameter part. Note that the URL of the Web access may be replaced with a description for activating a conference-specific application as illustrated in FIG. 3B.

The "type" indicates a type of a message, with which "PairingRequest" is set, so as to facilitate returning the read message as it is as a pairing request. The "id" is information that specifies the shared client terminal 10. The "id" is used as a destination (address) of the shared client terminal 10 to which the individual client terminal 20 transmits a message. The "uuid" sets randomized string for preventing the reuse of 2D code. Such a randomized string is transmitted together with transmission of the message from the individual client terminal 20 to the shared client terminal 10, and the shared client terminal 10 subsequently verifies whether the transmitted string matches the latest one, thereby preventing the reuse of the 2D code. A further limitation such as expiration date may be added to the string to secure the validity of the pairing. The 2D code may also include a public key for use in encrypting the message to be transmitted from the individual client terminal 20.

Referring back to FIG. 20, when the user activates an individual client terminal 20 (step S1103), the individual client terminal 20 logs in with an individual account in the activating process to display a destination list relating to the individual client terminal 20 (step S1104).

Figures 23, 24:
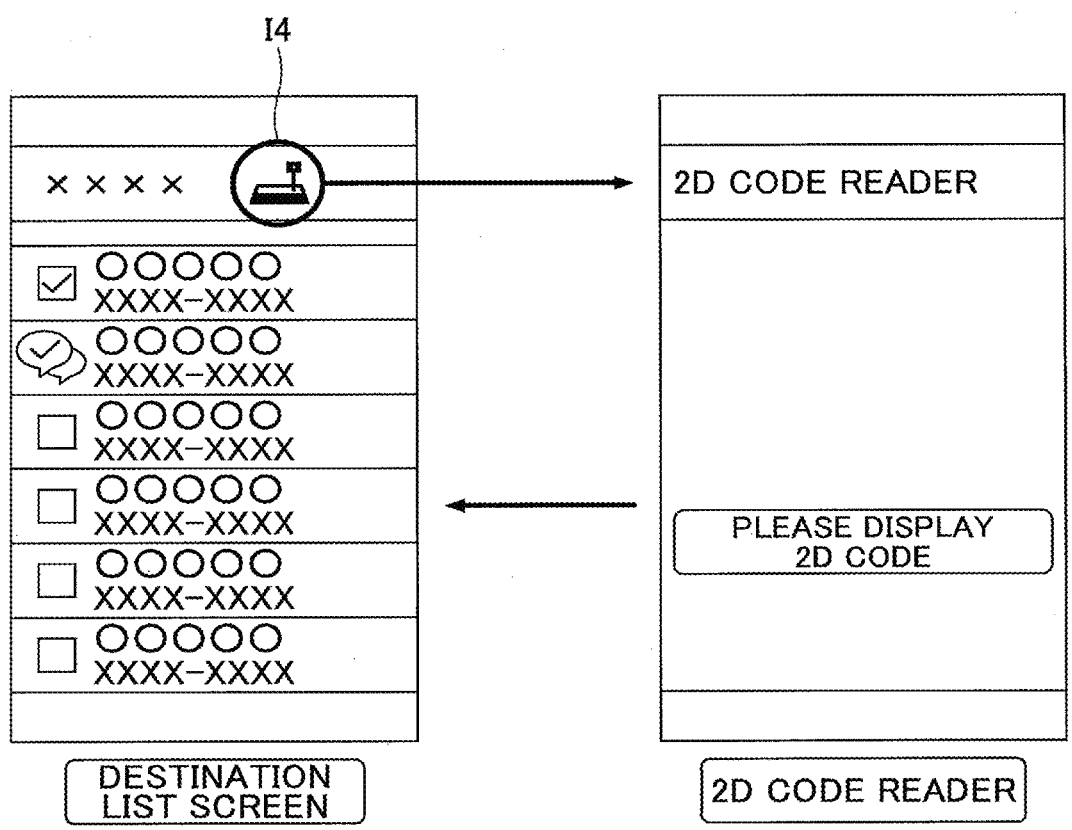
FIG. 23 is a diagram illustrating an example of an operation to start pairing.
FIG. 24 is a diagram illustrating an example of pairing acceptability response data.

When the user subsequently performs an operation to start pairing with the shared client terminal 10 (step S1105), the individual client terminal 20 activates a 2D code reader to read a 2D code on a screen of the shared client terminal 10 (step S1106). FIG. 23 is a diagram illustrating an operation example of starting a pairing process. A 2D code reader screen is displayed when the user taps a shared client terminal 10 icon 14 from the destination list screen.

Referring back to FIG. 20, the individual client terminal 20 transmits a pairing request to the transmission management system 50 based on content of the read 2D code (step S1107). Upon reception of the pairing request, the transmission management system 50 reports (or transmits a report of) the pairing request to a corresponding (specified) one of the shared client terminals 10 based on information specifying the shared client terminal 10 included in the pairing request (step S1108).

When the shared client terminal 10 that has received the report of the pairing request allows the pairing unconditionally, the shared client terminal 10 does not perform specific operations, and subsequently transmits a response of acceptability of the pairing to the individual client terminal 20 via the transmission management system 50. On the other hand, when the randomized string needs to be verified, the shared client terminal 10 that has received the report of the pairing request verifies the validity of the randomized string, and subsequently transmits a response of acceptability of the pairing to the individual client terminal 20 via the transmission management system 50 (steps S1109 and S1110). FIG. 24 is a diagram illustrating an example of pairing acceptability response data, which include a type "PairingResponse", and a result "accept".

When the pairing is acceptable, the pairing is established, and the individual client terminal 20 and the shared client terminal 10 mutually hold their paired counterparts' information. Note the once established pairing may be cancelled based on the user's operation.

Note that the above example has illustrated information being exchanged via the 2D code such as QR code; however, information may be exchanged via one-dimensional code (barcode), pattern recognition, action recognition, or the like.

The above example has also illustrated the communications between the individual client terminal 20 and the shared client terminal 10 being performed via the transmission management system 50 used for control of the TV conference; however, an independent system for message exchange may be prepared to perform such communications.

Incoming Call

Via Individual Conference

Figure 25:
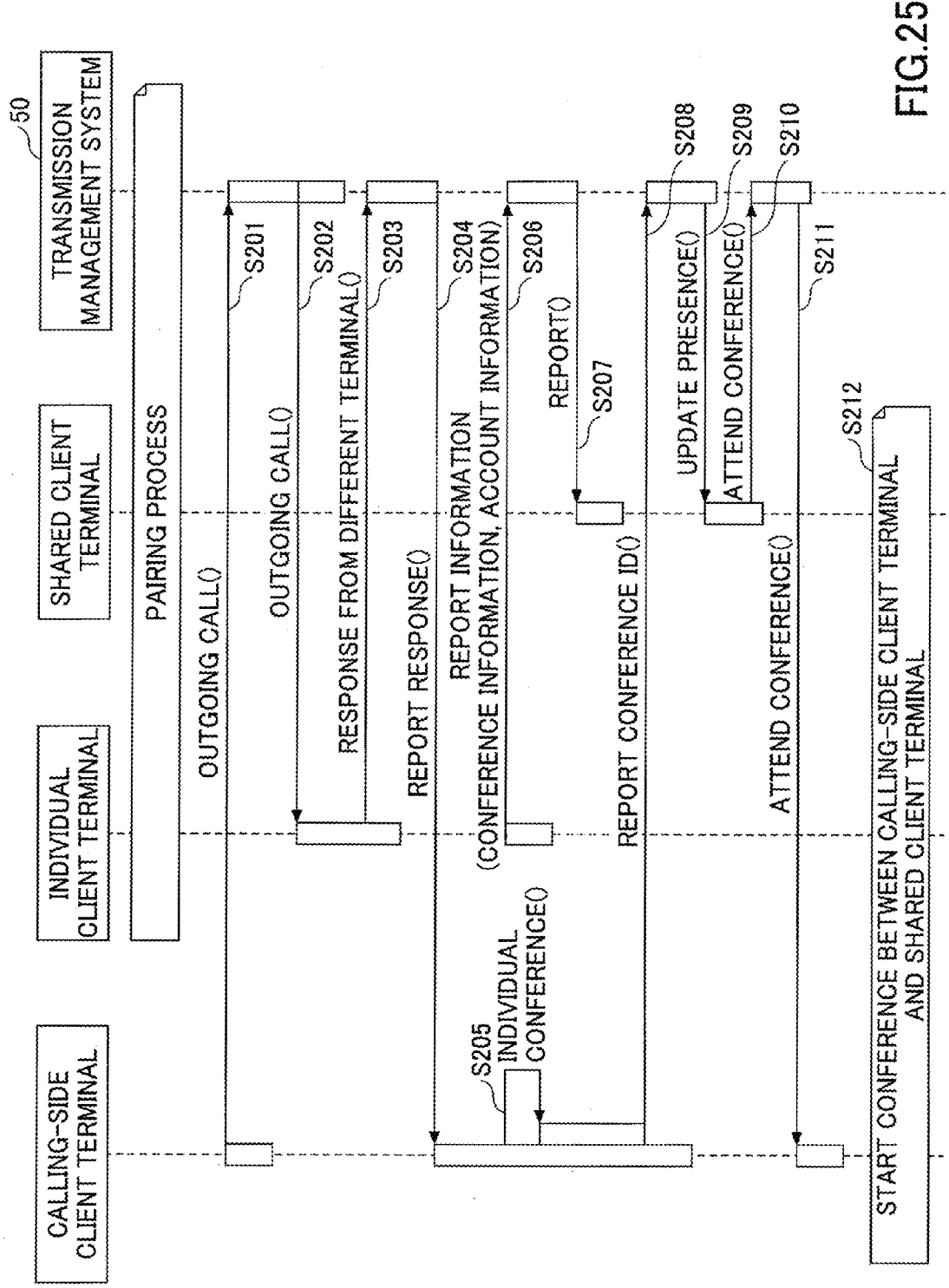
FIG. 25 is a sequence diagram illustrating a process example upon reception of an incoming call (1)

FIG. 25 is a sequence diagram illustrating a process example upon reception of an incoming call. In FIG. 25, it is assumed that the pairing process is completed in advance. When a calling-side client terminal (regardless of whether a special-purpose apparatus or a general-purpose apparatus) transmits an outgoing call to an individual account (step S201), an individual client terminal 20 receives an incoming call from the calling-side client terminal 10 or 20 via the transmission management system 50 (step S202). This is because a terminal that is in a login status with the individual account while being paired is an individual client terminal 20.

Figures 26, 27:
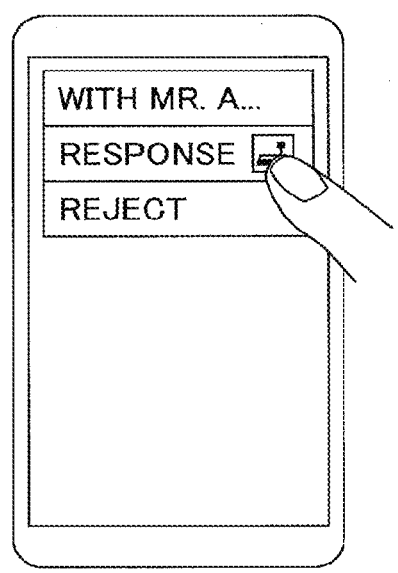
FIG. 26 is a diagram illustrating an example of an operation to respond to an individual client terminal upon reception of an incoming call.
FIG. 27 is a diagram illustrating an example of conference attendance data.

When the user uses the individual client terminal 20 to transmit a response to start a conference by the shared client terminal 10, the individual client terminal 20 transmits another terminal's response to the transmission management system 50 (step S203). FIG. 26 is a diagram illustrating an operation example of responding by the individual client terminal 20 upon reception of an incoming call. FIG. 26 specifically illustrates an example in which the user (a receiver) selects "a response to start a conference by the shared client terminal" from optional responses of "a response to start a conference normally", "a response to start a conference by the shared client terminal", and "a response to reject" with respect to a calling source "Mr. A". Note that receiving an incoming call while being paired may automatically transmit a "response to start TV conference by shared client terminal".

Referring back to FIG. 25, the transmission management system 50 reports the other terminal's response to the calling-side client terminal (step S204), and the calling-side client terminal starts an individual (private) conference (step S205).

The individual client terminal 20 reports conference information specifying both the caller and the receiver of the TV conference and authorization information (e.g., login information) for using the TV conference service with individual accounts to the transmission management system 50 based on information about a counterpart of the predetermined pair (step S206). The transmission management system 50 subsequently transmits the received information to the shared client terminal 10 (step S207).

On the other hand, the calling-side client terminal that has started the individual conference reports a conference ID specifying the TV conference to the transmission management system 50 (step S208). The transmission management system 50 subsequently updates the presence of the shared client terminal 10 based on the received conference ID (step S209).

The shared client terminal 10 then transmits a conference attendance request to the transmission management system 50 by specifying the conference ID (step S210). In this step, the shared client terminal 10 may re-log in with an individual account or may re-establish connection instead of the re-login, based on the authorization information. FIG. 27 is a diagram illustrating an example of conference attendance data, which include a type: "StartCOnf", a conference ID "ConfID": "361", and authorization information "ConfToken": "kgueq_ip91a".

Referring back to FIG. 25, the transmission management system 50 reports the conference attendance to the calling-side client terminal (step S211), and starts the TV conference between the calling-side client terminal and the shared client terminal 10 (step S212).

As behaviors after the TV conference has started, the status of the individual client terminal 20 may be any status insofar as there is no limitation from the transmission management system 50. However, when the user participates in a TV conference using a different client terminal including the individual client terminal 20 during the TV conference being held by the shared client terminal 10 using the individual account, the individual client terminal 20 may be operated to be in a logout status by performing exclusive control. The display status of the TV conference may include a combination of the shared client terminal 10 name and the individual account name, which is used by display of attendees. Further, transmission of an incoming call to any of the individual account and the shared account may allow the user to join the TV conference in the middle of the conference. The shared client terminal 10 does not maintain a login status with the individual account. Hence, when the TV conference using the individual account is finished, the shared client terminal 10 returns to the status the same as the standby status immediately after the activation of the shared client terminal 10.

Via Three-Locational Conference

Figure 28:
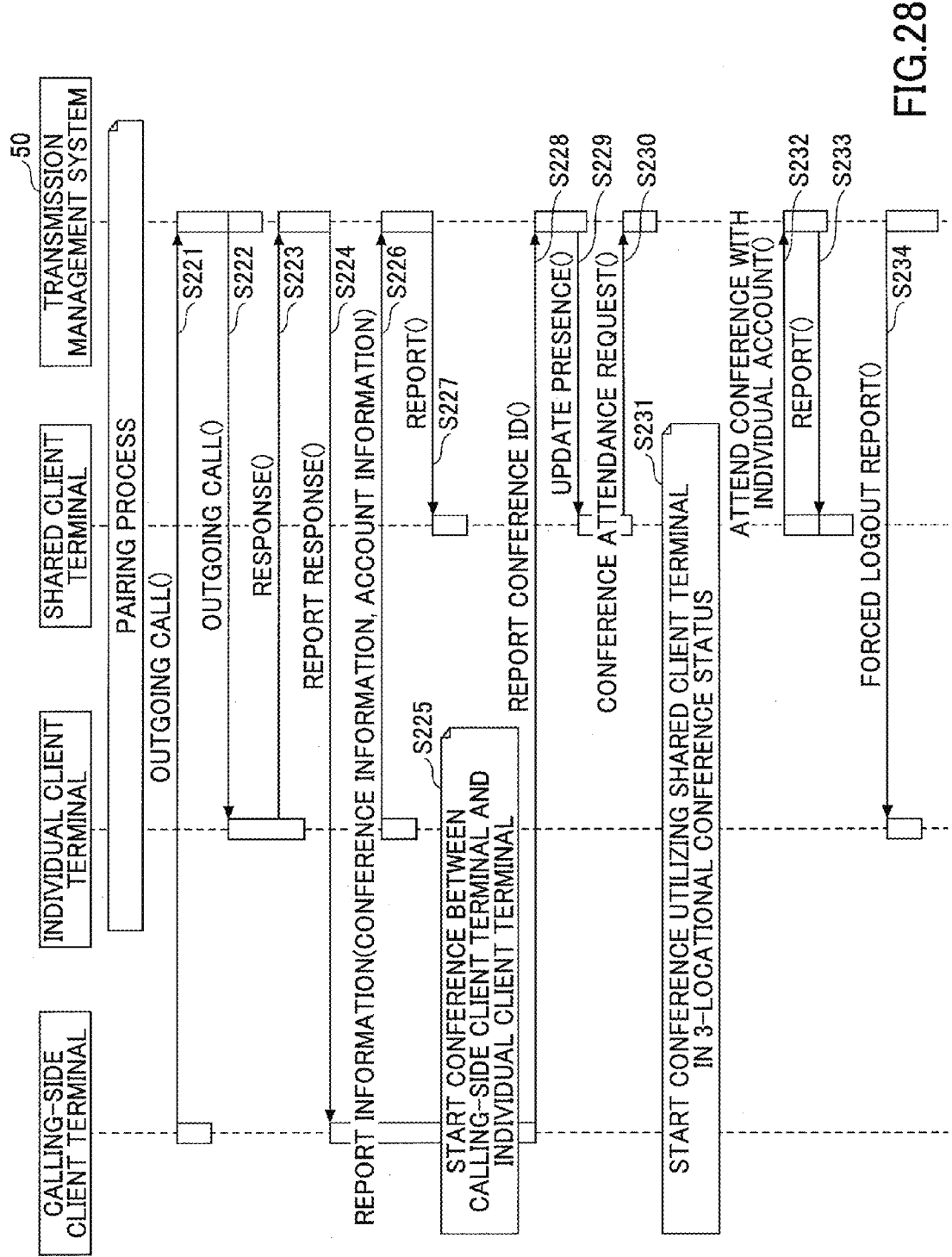
FIG. 28 is a sequence diagram illustrating a process example upon reception of an incoming call (2)

FIG. 28 is a sequence diagram illustrating another process example upon reception of an incoming call. In FIG. 28, it is assumed that the pairing process is completed in advance. When a calling-side client terminal (regardless of the special-purpose apparatus and the general-purpose apparatus) transmits an outgoing call to an individual account (step S221), an individual client terminal 20 receives an incoming call from the calling-side client terminal via the transmission management system 50 (step S222). This is because a terminal that is in a login status with the individual account while being paired is the individual client terminal 20.

When a user uses the individual client terminal 20 to transmit a response to start a conference by the shared client terminal 10, the individual client terminal 20 transmits a normal response to the transmission management system 50 (step S223).

The transmission management system 50 transmits a response to the calling-side client terminal (step S224), and starts a conference between the calling-side client terminal and the individual client terminal (step S225). Note that in this step, the individual client terminal 20 does not actually move to the conference, and does not shift to a conference screen.

The individual client terminal 20 reports conference information specifying both a caller and a receiver of the TV conference and authorization information (e.g., login information) for using the TV conference service with individual accounts to the transmission management system 50 based on information about a counterpart of the predetermined pair (step S226). The transmission management system 50 subsequently transmits the received information to the shared client terminal 10 (step S227).

On the other hand, the calling-side client terminal reports a conference ID specifying the TV conference to the transmission management system 50 (step S228). The transmission management system 50 subsequently updates the presence of the shared client terminal 10 based on the received conference ID (step S229).

The shared client terminal 10 then transmits a conference attendance request to the transmission management system 50 by specifying the conference ID (step S230). Thus, a three-locational conference between the calling-side client terminal, the individual client terminal 20, and the shared client terminal 10 starts (step S231).

The shared client terminal 10 subsequently transmits a conference attendance request to attend a conference with the individual account based on authorization information to the transmission management system 50 (steps S232 and S233). The transmission management system 50 subsequently transmits a forced logout report to the individual client terminal 20 (step S234), and the three-locational conference shifts to a two-locational conference between the calling-side client terminal and the individual client terminal 20.

Construction of Conference Session

Figure 29:
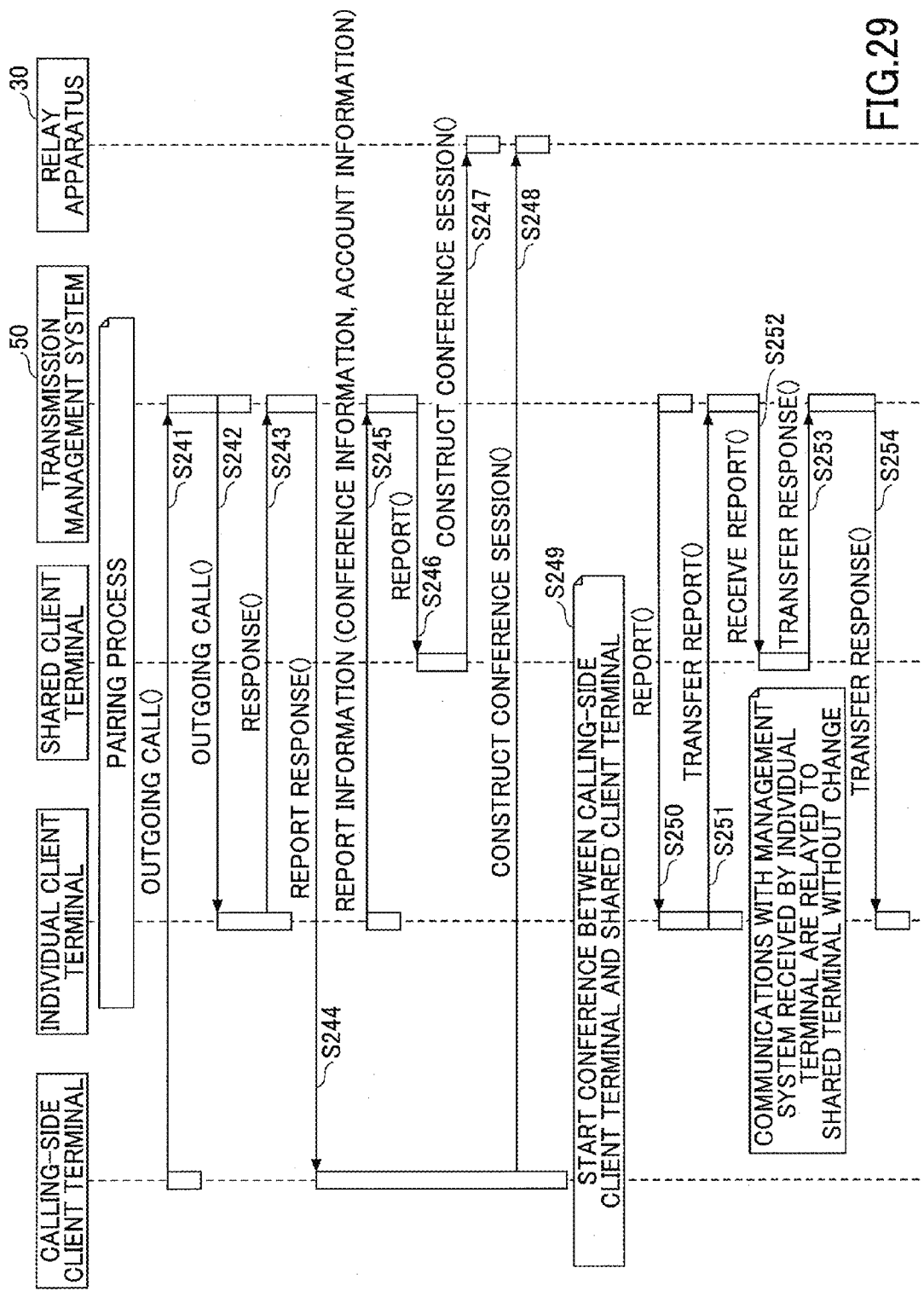
FIG. 29 is a sequence diagram illustrating a process example upon reception of an incoming call (3)

FIG. 29 is a sequence diagram illustrating another process example upon reception of an incoming call. In FIG. 29, it is assumed that the pairing process is completed in advance. When a calling-side client terminal (regardless of the special-purpose apparatus and the general-purpose apparatus) transmits an outgoing call to an individual account (step S241), an individual client terminal 20 receives an incoming call from the calling-side client terminal via the transmission management system 50 (step S242). This is because a terminal that is in a login status with the individual account while being paired is the individual client terminal 20.

When a user uses the individual client terminal 20 to transmit a response to start a conference by the shared client terminal 10, the individual client terminal 20 transmits a normal response to the transmission management system 50 (step S243). The transmission management system 50 reports the response to the calling-side client terminal (step S244).

The individual client terminal 20 reports conference information specifying both a caller and a receiver of the TV conference and authorization information (e.g., login information) for using the TV conference service with individual accounts to the transmission management system 50 based on information about a counterpart of the predetermined pair (step S245). The transmission management system 50 subsequently transmits the received information to the shared client terminal 10 (step S246).

The shared client terminal 10 and the sender client terminal transmit respective conference session construction requests to the relay apparatus 30 (steps S247 and S248). Note that a license management session and a TV conference session are mutually independent of each other. Thus, a TV conference starts between the calling-side client terminal and the shared client terminal 10 (step S249).

When the transmission management system 50 subsequently transmits a report relating to authentication-authorization to the individual client terminal 20 (step S250), the individual client terminal 20 transmits the received report to the shared client terminal 10 via the transmission management system 50 (steps S251 and S252). The shared client terminal 10 subsequently transmits a response to the individual client terminal 20 via the transmission management system (steps S253 and S254).

Figure 30:
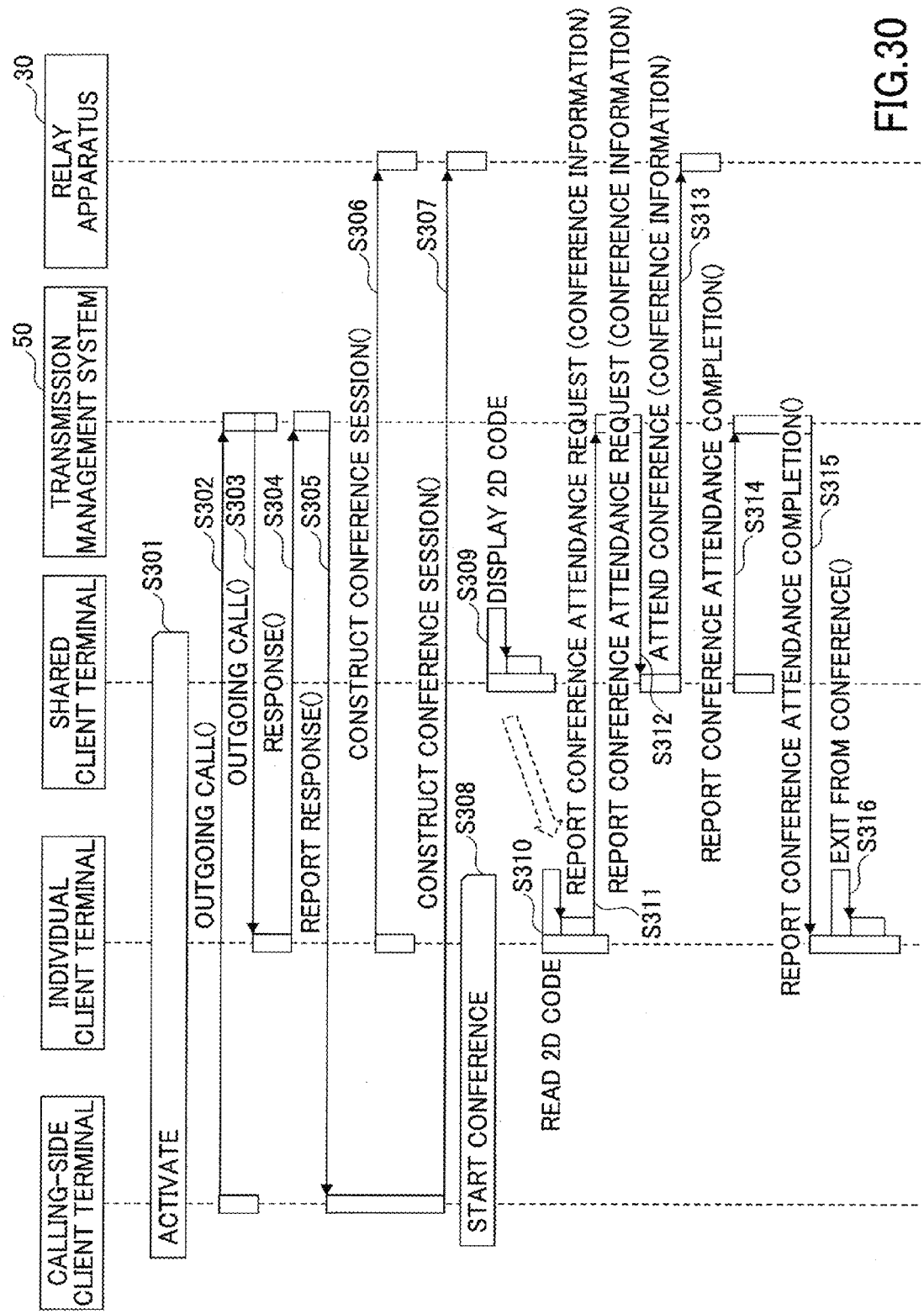
FIG. 30 is a sequence diagram illustrating a process example of moving a conference already started in the individual client terminal to the shared client terminal.

Moving Conference Already Started in Individual Client Terminal to Shared Client Terminal FIG. 30 is a sequence diagram illustrating a process example of moving a conference already started in the individual client terminal 20 to the shared client terminal 10. As illustrated in FIG. 30, when the calling-side client terminal calls the individual client terminal 20 (step S302) while the calling-side client terminal (regardless of the special-purpose apparatus and the general-purpose apparatus), and the shared client terminal 10 are in the activation statuses (step S301), an incoming call from the calling-side client terminal reaches the individual client terminal 20 via the transmission management system 50 (step S303).

When the individual client terminal 20 responds to the incoming call via the transmission management system 50 (step S304), the transmission management system 50 reports the response to the calling-side client terminal (step S305).

The individual client terminal 20 and the calling-side client terminal subsequently transmit construction requests for a conference session to the relay apparatus 30 (steps S306 and S307) so as to start a conference (step S308).

On the other hand, the shared client terminal 10 in the standby mode displays a 2D code indicating an address of the shared client terminal 10 itself (step S309). Data included in the 2D code are similar to those illustrated in FIG. 18.

Figures 31, 32, 33:
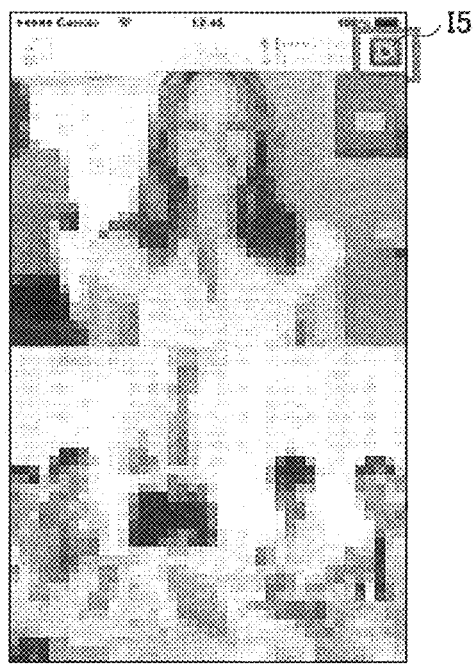
FIG. 31 is a diagram illustrating an example of an operation to move the conference.
FIG. 32 is a diagram illustrating an example of a conference attendance request report.
FIG. 33 is a diagram illustrating an example of a conference attendance completion report.

In FIG. 30, when the user desires to move the conference held in the individual client terminal 20 to the shared client terminal 10, the user performs a predetermined operation to start a camera function to scan the 2D code displayed on the shared client terminal 10 (step S310). FIG. 31 is a diagram illustrating an example of an operation to move the conference. Tapping the icon 15 at the upper right corner will activate the camera function.

Referring back to FIG. 30, when the individual client terminal 20 reads the 2D code, the individual client terminal 20 sends a conference attendance request specifying the shared client terminal 10 and the conference information to the transmission management system 50 (step S311).

The transmission management system 50 reports the conference attendance request to the shared client terminal 10 (step S312). FIG. 32 is a diagram illustrating an example of a conference attendance request report. The conference attendance request report includes a conference attendance request and conference information.

Referring back to FIG. 30, the shared client terminal 10 transmits a conference attendance request to the relay apparatus 30 (step S313). The shared client terminal 10 also transmits a conference attendance completion report to the transmission management system 50 (step S314), and the transmission management system 50 transmits the conference attendance completion report to the individual client terminal 20 (step S315). FIG. 33 is a diagram illustrating an example of the conference attendance completion report. The conference attendance completion report indicates a response to the conference attendance request that has completed.

Figure 34:
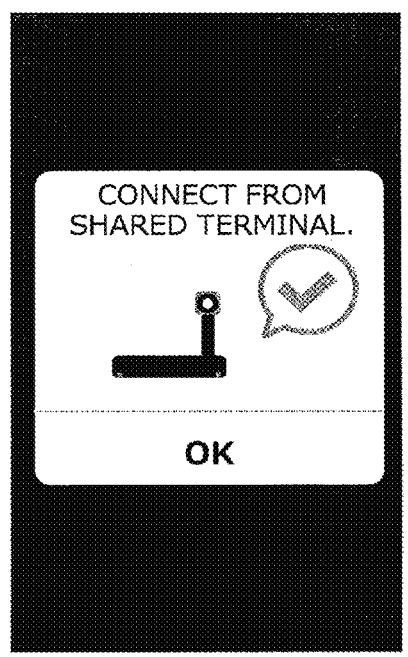
FIG. 34 is a diagram illustrating a display example of the individual client terminal after transmitting the conference attendance completion report.

Referring back to FIG. 30, the individual client terminal 20 that has received the conference attendance completion report exits from the conference (step S316), and the user of the individual client terminal 20 continues the conference by the shared client terminal 10. FIG. 34 is a diagram illustrating a display example of the individual client terminal 20 after transmitting the conference attendance completion report. The individual client terminal 20 displays a screen indicating that the individual client terminal 20 is connected by the shared client terminal 10 (the shared terminal).

Outline

The disclosures described above enable to provide a technology capable of translating a code structure differently according to the different applications that have read the code structure having information capable of being translated differently, enabling the code structure to serve different roles adaptable to various usage.

Note that the special-purpose apparatus may include at least one of a software component and a hardware component exhibiting the performance differing from the performance of a corresponding one of the software component and the hardware component of the general-purpose apparatus. Note also that not all the performances of the hardware components of the special-purpose apparatus may need to be higher than the performances of the hardware components of the general-purpose apparatus.

In the above-described embodiments, a TV conference-specific terminal is illustrated as an example of the special-purpose apparatus. However, the special-purpose apparatus is not limited to this example. The special-purpose apparatus may be another special-purpose apparatus such as an IP (Internet protocol) phone or an Internet phone. The special-purpose apparatus may also be a smartphone, a tablet terminal, a mobile phone, a car navigation terminal, a wearable computer, a camera, a projector, an electronic whiteboard, a game machine, and electronic signage (digital signage), or an industrial apparatus having communications functions. The wearable computer includes a watch, a head-mounted display, and the like. The industrial apparatus includes an office apparatus such as multifunction peripheral/printer/product and the like, a medical instrument such as an endoscope, and an agricultural apparatus such as a cultivator.

The general-purpose apparatus may include a notebook PC, a smartphone, a tablet terminal, a mobile phone, and a wearable computer.

The transmission management system 50, the relay apparatus 30, and the program providing system 90 described above may be constructed by a single computer, or may be constructed by multiple computers to each of which a corresponding one of components (functions and units) of the transmission management system 50, the relay apparatus 30, and the program providing system 90 are discretely assigned. In addition, when the program providing system 90 is constructed by a single computer, the programs transmitted by the program providing system 90 may be divided into multiple modules, or the programs may be transmitted without being divided into multiple modules. Further, when the program providing system 90 is constructed by multiple computers, the programs may be divided into multiple modules assigned to the computers, each of which may be transmitted from a corresponding one of the computers.

The preferred embodiments are described above. The above-described embodiments illustrate specific examples of the invention; however, the present invention is not limited to these examples, and various alterations or changes may be made without departing from the gist and the scope of the claims of the present invention. Specifically, the present invention shall not be construed as being limited to details of the specific examples and accompanying drawings thereof.

Correspondence Between Terms in the Embodiments and Terms in the Claims

The "information processing apparatus T2" is an example of an "information processing apparatus". The "2D code" is an example of a "code structure". The "general-purpose application T2-4" is an example of a "general-purpose application". The "OS T2-1" is an example of "basic software". The "special-purpose application T2-5" is an example of a "special-purpose application". The "part p1" is an example of a "first part". The "part p2" is an example of a "second part".

According to the disclosed technology, a code structure may be translated differently based on the different applications that have read the code structure having information capable of being translated differently, which enables the code structure to serve different roles adaptable to various usage.

The present invention is not limited to the specifically disclosed embodiments, and variations and modifications may be made without departing from the scope of the present invention.

The present application is based on and claims the benefit of priority of Japanese Priority Application No. 2015-131462 filed on Jun. 30, 2015, the entire contents of which are hereby incorporated herein by reference.

What is claimed is:

1. An information processing apparatus provided with a camera function and having a general-purpose application and a special-purpose application installed therein, the information processing apparatus comprising:
  a reader configured to read a code structure imaged by the camera function to convert the code structure into a string having a first part and a second part; and
  a translator configured to translate the string,
  wherein when the code structure is read by the general-purpose application, the first part of the string is translated as a URI via the general-purpose application to activate basic software function, and when the code structure is read by the special-purpose application, the second part of the string is translated via the special-purpose application to activate a function of the special-purpose application.

2. The information processing apparatus according to claim 1,
  wherein the first part of the string is translated as a URL to activate Web access.

3. The information processing apparatus according to claim 1,
  wherein the first part of the string is used as an identifier of the special-purpose application to activate the special-purpose application.

4. The information processing apparatus according to claim 1,
  wherein the special-purpose application is a remote conference application, and
  wherein the remote conference application uses the second part of the string as a shared account address of a shared client terminal to transmit an outgoing call relay request accompanying destination information and individual account information to a transmission management system.

5. The information processing apparatus according to claim 1, wherein the special-purpose application is a remote conference application, and wherein the second part of the string is used as a shared account address of a shared client terminal by the remote conference application to perform pairing in advance between the information processing apparatus and the shared client terminal such that the information processing apparatus receives an incoming call for attending a conference via the shared client terminal.

6. The information processing apparatus according to claim 1, wherein the special-purpose application is a remote conference application, and wherein the remote conference application uses the second part of the string as a shared account address of a shared client terminal to transmit a conference attendance request accompanying information about a conference already started in the information processing apparatus.

7. A non-transitory computer-readable recording medium storing a program which when processed by processors, causes a computer to execute a process, the process comprising:

reading a code structure imaged by a camera function provided with an information processing apparatus to convert the read code structure into a string having a first part and a second part;

translating, when the code structure is read by a general-purpose application within the information processing apparatus, the first part of the string as a URI via the general-purpose application to activate basic software function; and translating, when the code structure is read by a special-purpose application within the information processing apparatus, the second part of the string via the special-purpose application to activate a special-purpose application function.

* * * * *